(12) United States Patent
Landgraf

(10) Patent No.: US 12,054,063 B2
(45) Date of Patent: Aug. 6, 2024

(54) METHOD AND SYSTEMS FOR ENERGY EXCHANGE BETWEEN VEHICLES

(71) Applicant: FREIE UNIVERSITÄT BERLIN, Berlin (DE)

(72) Inventor: Tim Landgraf, Bad Saarow (DE)

(73) Assignee: FREIE UNIVERSITÄT BERLIN, Berlin (DE)

( * ) Notice: Subject to any disclaimer, the term of this patent is extended or adjusted under 35 U.S.C. 154(b) by 1155 days.

(21) Appl. No.: 16/612,302

(22) PCT Filed: May 9, 2018

(86) PCT No.: PCT/EP2018/062082
§ 371 (c)(1),
(2) Date: Jan. 27, 2020

(87) PCT Pub. No.: WO2018/206684
PCT Pub. Date: Nov. 15, 2018

(65) Prior Publication Data
US 2023/0182599 A1 Jun. 15, 2023

(30) Foreign Application Priority Data
May 10, 2017 (DE) ...................... 10 2017 207 926.6

(51) Int. Cl.
*B60L 53/57* (2019.01)
*B60L 50/60* (2019.01)
(Continued)

(52) U.S. Cl.
CPC ............... *B60L 53/57* (2019.02); *B60L 50/60* (2019.02); *B60L 53/12* (2019.02); *B60L 53/126* (2019.02);
(Continued)

(58) Field of Classification Search
CPC ........ B60L 53/57; B60L 53/126; B60L 53/38; B60L 53/53; B60L 2240/62; B60L 50/60;
(Continued)

(56) References Cited

U.S. PATENT DOCUMENTS

| 7,113,108 B1 * | 9/2006 | Bachelder | G08G 1/087 340/941 |
| 8,649,966 B2 * | 2/2014 | Kamata | G08G 1/0962 701/409 |

(Continued)

FOREIGN PATENT DOCUMENTS

| BR | 112016011577 B1 * | 1/2021 | ............. A01B 51/02 |
| CN | 103262584 A * | 8/2013 | .......... H04W 72/044 |

(Continued)

OTHER PUBLICATIONS

Leopold Summerer et al. "Concepts for wireless energy transmission via laser" Nov. 8, 2012; Retrieved from the Internet: https://www.esa.int/gsp/ACT/doc/POW/ACT-RPR-NRG-2009-SPS-ICSOS-concepts-for-laser-WPT.pdf [retrieved on Nov. 7, 2019] XP055503517.
(Continued)

*Primary Examiner* — Nha T Nguyen
(74) *Attorney, Agent, or Firm* — Maschoff Brennan

(57) ABSTRACT

A method for the exchange of electrical energy between at least two moving, electrically powered vehicles, comprising the steps: providing a first and a second electrically powered vehicle, having a respective electrical energy store, the energy store of the first and the second vehicle can emit or receive electrical energy, and the first and second vehicles move or are to be moved along a first or second route; changing the first and second routes in such a way that both changed routes coincide along a route section; steering the first and second vehicle along the changed first and second route in such a way that both the vehicles move along the coinciding route section at a distance to one another that is
(Continued)

smaller than a predefined maximum distance; and transferring electrical energy from the energy store of the first vehicle to the energy store of the second vehicle.

19 Claims, 12 Drawing Sheets

(51) Int. Cl.
*B60L 53/12* (2019.01)
*B60L 53/126* (2019.01)
*B60L 53/34* (2019.01)
*B60L 53/35* (2019.01)
*B60L 53/38* (2019.01)
*B60L 53/53* (2019.01)
*G05D 1/00* (2006.01)

(52) U.S. Cl.
CPC .............. *B60L 53/34* (2019.02); *B60L 53/35* (2019.02); *B60L 53/38* (2019.02); *B60L 53/53* (2019.02); *G05D 1/0088* (2013.01); *G05D 1/0223* (2013.01); *G05D 1/0291* (2013.01); *B60L 2240/62* (2013.01)

(58) Field of Classification Search
CPC .......... B60L 53/12; B60L 53/34; B60L 53/35; B60L 53/16; B60L 2240/622; B60L 2260/32; B60L 2240/12; B60L 2240/68; G05D 1/0088; G05D 1/0223; G05D 1/0291; Y02T 10/70; Y02T 10/7072; Y02T 10/72; Y02T 90/12; Y02T 90/14; Y02T 90/16; G01C 21/3415; G01C 21/3469
See application file for complete search history.

(56) References Cited

U.S. PATENT DOCUMENTS

| | | | |
|---|---|---|---|
| 9,381,818 B2 * | 7/2016 | Gerstenberg | B60L 5/16 |
| 9,744,870 B2 * | 8/2017 | Cronie | H02J 50/90 |
| 10,071,641 B2 * | 9/2018 | Ricci | B60L 3/0015 |
| 10,108,202 B1 | 10/2018 | Aikin et al. | |
| 2009/0176457 A1 * | 7/2009 | Christensen | G01S 13/74 455/69 |
| 2013/0076296 A1 * | 3/2013 | Ushiroda | B60L 53/38 320/109 |
| 2014/0089064 A1 | 3/2014 | Hyde et al. | |
| 2014/0188318 A1 | 7/2014 | Langgood et al. | |
| 2015/0336677 A1 * | 11/2015 | Smaoui | H02J 7/0014 320/109 |
| 2016/0129793 A1 | 5/2016 | Cronie | |
| 2018/0217245 A1 * | 8/2018 | Riess | G01S 11/10 |
| 2018/0290561 A1 | 10/2018 | Baumgärtner | |
| 2019/0279440 A1 * | 9/2019 | Ricci | H04W 4/48 |

FOREIGN PATENT DOCUMENTS

| | | | | |
|---|---|---|---|---|
| CN | 206200964 U | * | 5/2017 | |
| CN | 106364334 B | * | 3/2019 | |
| DE | 4240989 C2 | | 2/1997 | |
| DE | 102005052038 A1 | * | 5/2007 | ............ B25D 9/08 |
| DE | 102012216980 A1 | * | 4/2013 | ............ B25J 13/085 |
| DE | 102012214750 A1 | | 11/2013 | |
| JP | 2001236530 A | * | 8/2001 | |
| JP | 2010035333 A | | 2/2010 | |
| JP | 2013070514 A | * | 4/2013 | |
| WO | WO-2014134551 A1 | * | 9/2014 | ............ G08G 1/00 |
| WO | 2016156383 A1 | | 10/2016 | |
| WO | WO-2017204798 A1 | * | 11/2017 | ............ B60L 53/36 |

OTHER PUBLICATIONS

Segata, Michele et al. "On Platooning Control using IEEE 802.11p in Conjunction with Visible Light Communications." 2016 12th Annual Conference on Wireless On-demand Network Systems and Services (WONS), 124-127.
EP Office Action in Application No. 18 725 448.7 dated Nov. 23, 2021.
Vikram Iyer, "Charging a Smartphone Across a Room Using Lasers", Dec. 2017.
Leandros A. Maglaras et al., "Dynamic wireless charging of electric vehicles on the move with Mobile Energy Disseminators", International Journal of Advanced Computer Science and Applications, vol. 6, No. 6, Jun. 2015.
Alvaro et al., "Vehicle to vehicle energy exchange in smart grid applications", IEEE, Nov. 3, 2014.
Mickel Budhia et al., "Development of a Single-Sided Flux Magnetic Coupler for Electric Vehicle IPT Charging Systems", IEEE Transactions on Industrial Electronics, vol. 60, No. 1, Dec. 9, 2011.
Kanok Boriboonsomsin et al., "Eco-Routing Navigation System Based on Multisource Historical and Real-Time Traffic Information", IEEE Transactions on Intelligent Transportation Systems, vol. 13, No. 4, Jul. 10, 2012.
Jaegue Shin et al., "Design and Implementation of Shaped Magnetic-Resonance-Based Wireless Power Transfer System for Roadway-Powered Moving Electric Vehicles", IEEE Transaction on Industrial Electronics, vol. 61, No. 3, Apr. 16, 2013.
Farriborz Musavi, Wilson Eberle, "Overview of wireless power transfer technologies for electric vehicle battery charging", IET Power Electronics, May 11, 2013.
Promiti Dutta, "Coordinating Rendezvous Points for Inductive Power Transfer between Electric Vehicles to Increase Effective Driving Distance", International Conference on Connected Vehicles and Expo, Dec. 2, 2013.
Wei Zhang et al., "Loosely Coupled Transformer Structure and Interoperability Study for EV Wireless Charging Systems", IEEE Transactions on Power Electronics, vol. 30, No. 11, May 14, 2015.
Raffaele Gambuti et al., "Electric Vehicle Trip Planning Integrating Range Constraints and Charging Facilities", 23rd Mediterranean Conference on Control and Automation, Jun. 16, 2015.
Giuseppe Buja et al., "Dynamic Charging of Electric Vehicles by Wireless Power Transfer", IEEE Transactions on Industrial Electronics, vol. 63, No. 10, Oct. 2016.
Alexandros-Michail Koufakis et al., "Towards an Optimal EV Charging Scheduling Scheme with V2G and V2V Energy Transfer", IEEE International Conference on Smart Grid Communications: Control and Operation for Smart Grids, Microgrids and Distributed Resources, Nov. 2016.
Taylor M. Fisher et al., "Electric vehicle wireless charging technology: a state-of-the-art review of magnetic coupling systems", Sep. 12, 2014.
Omer C. Onar et al., "Wireless Charging of Electric Vehicles", Oak Ridge National Laboratory, Jun. 20, 2016.
Constantin Caruntu et al., "Distributed Model Predictive Control for Vehicle Platooning a brief Survey", International Conference on System Theory, Control and Computing, Oct. 13, 2016.
Hong Quy Le et al., "Communication Protocol for Platoon of Electric Vehicles in mixed Traffic Scenarios", IEEE, Sep. 2016.

* cited by examiner

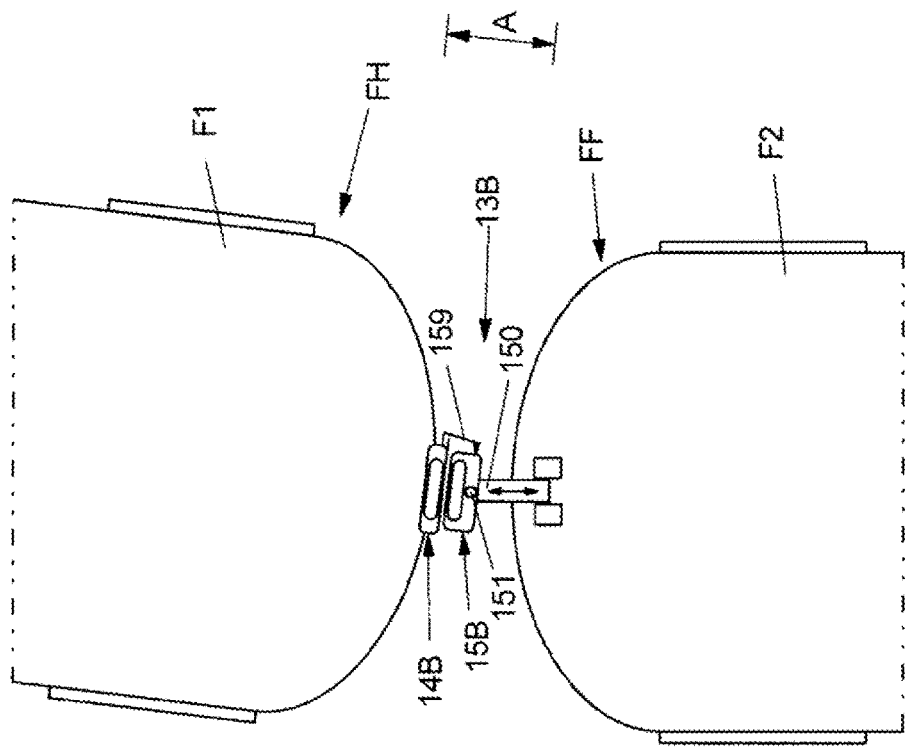
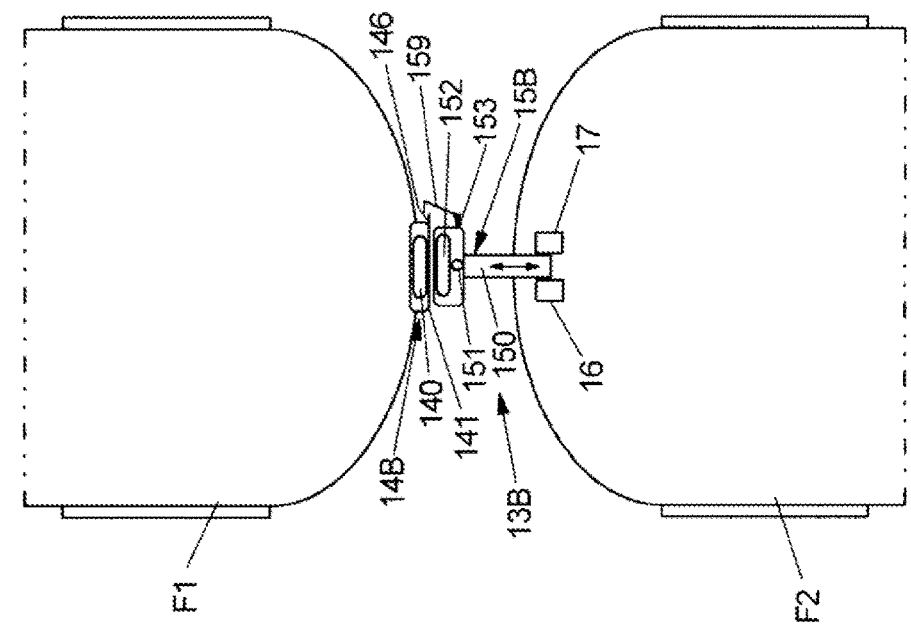

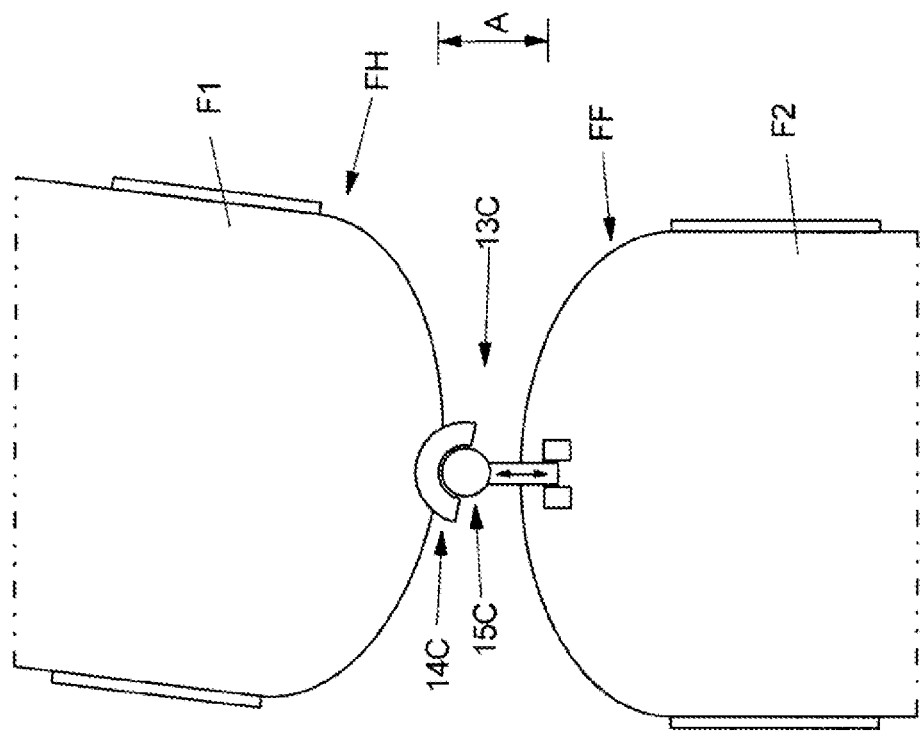
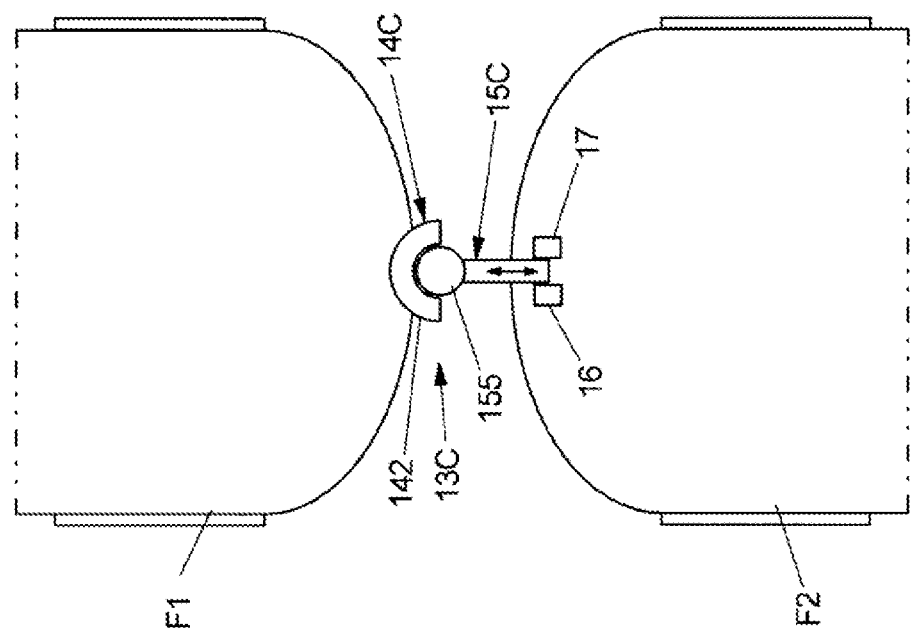

FIG 7A
FIG 7B
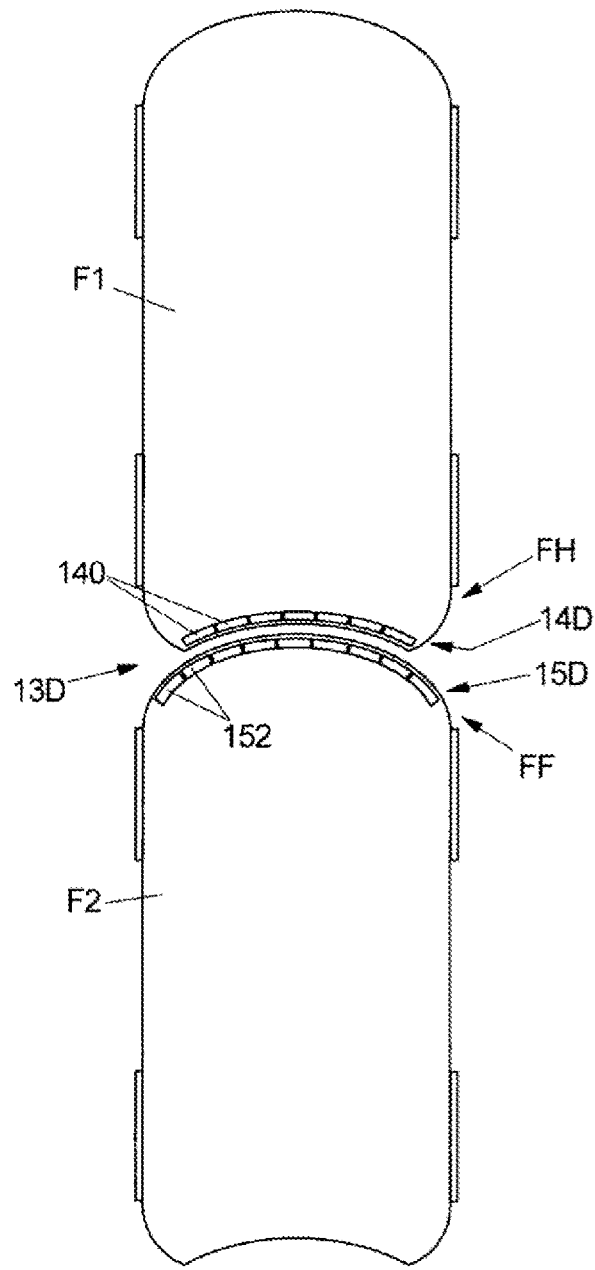
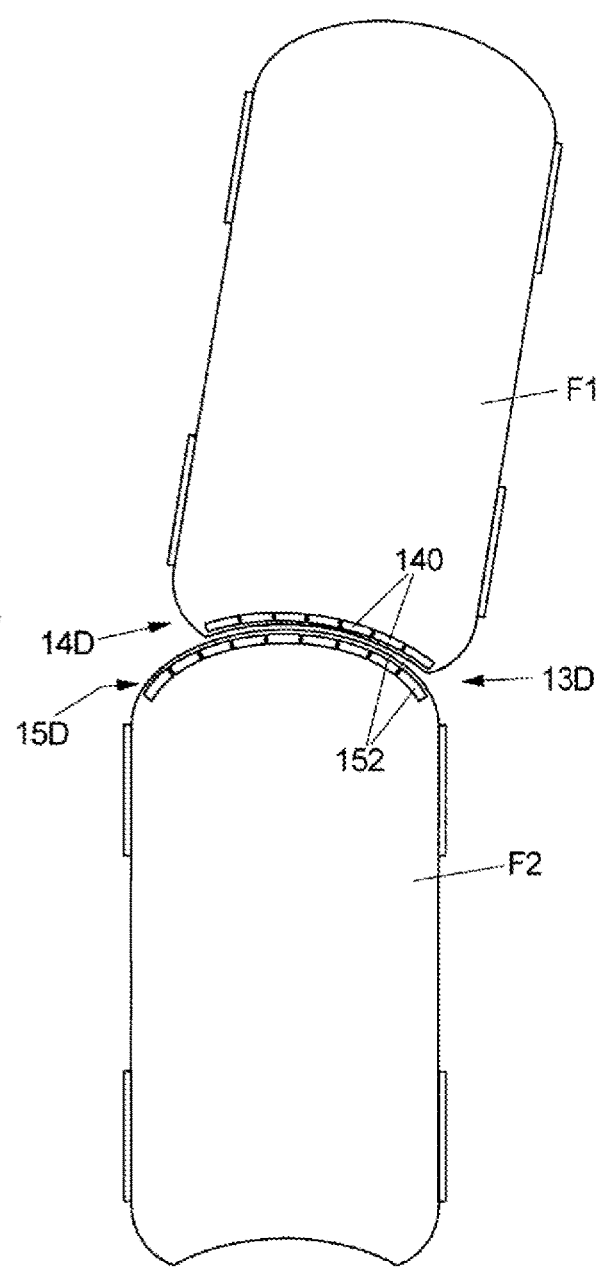

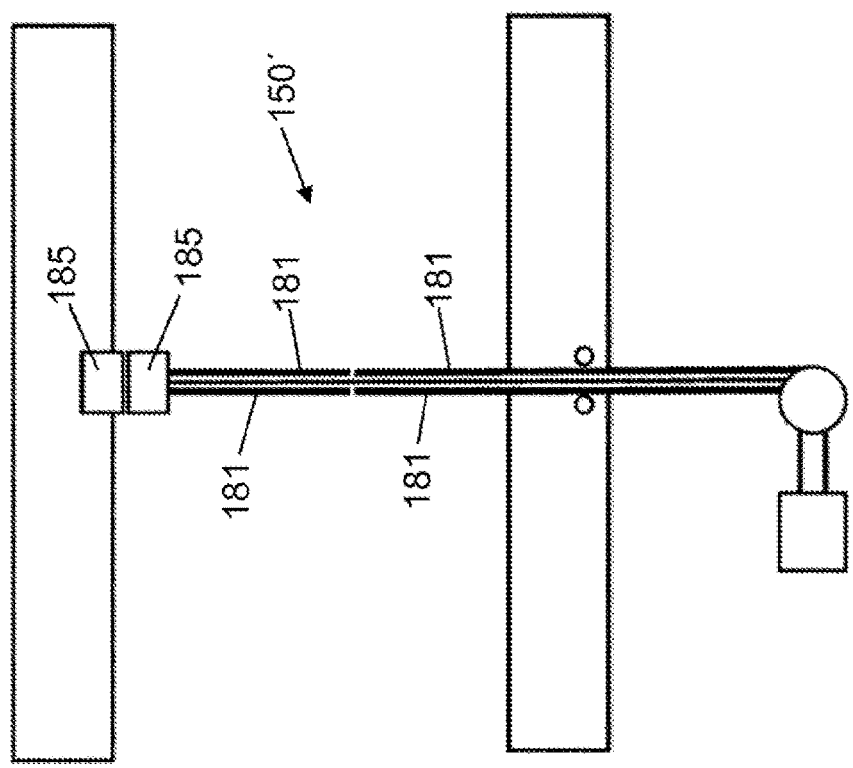
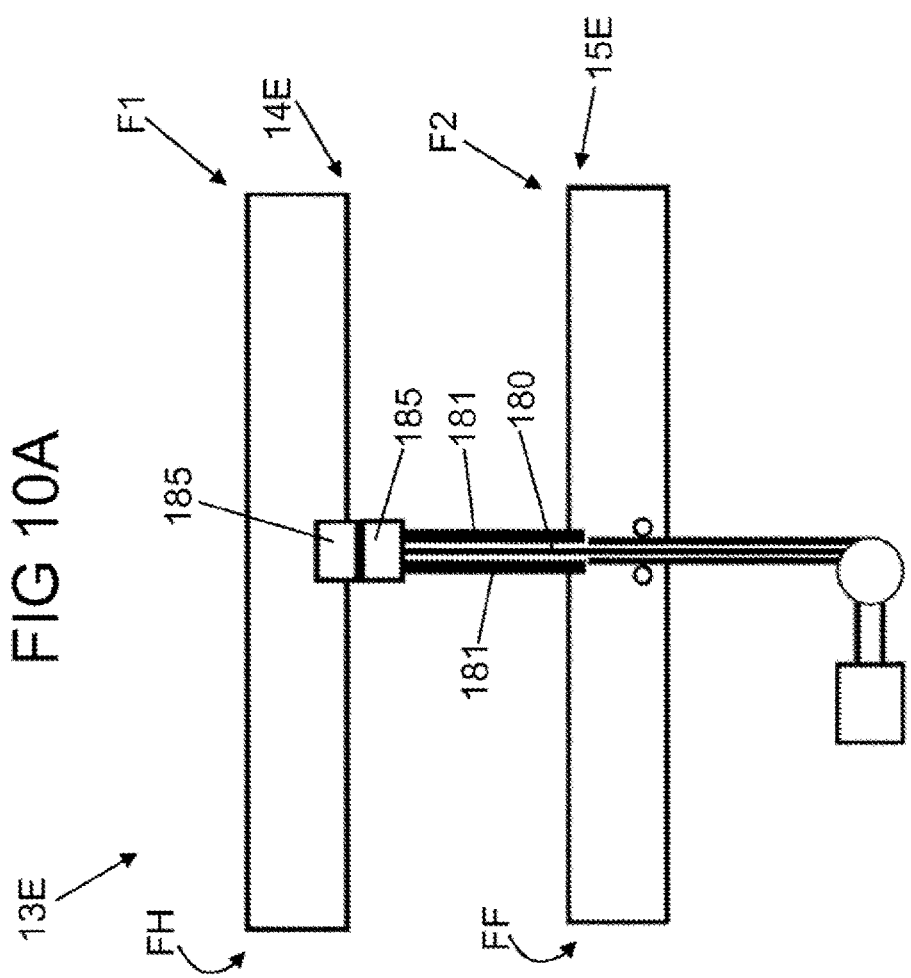

METHOD AND SYSTEMS FOR ENERGY EXCHANGE BETWEEN VEHICLES

CROSS-REFERENCE TO A RELATED APPLICATION

This application is a National Phase Patent Application of International Patent Application Number PCT/EP2018/062082, filed on May 9, 2018, which claims priority of German Patent Application Number 10 2017 207 926.6, filed on May 10, 2017.

BACKGROUND

The disclosure relates to a method and a system for the exchange of electrical energy between moving electrically powered vehicles, and to an electrically powered vehicle which is configured to be used in a method and/or system of this type.

Electrically powered vehicles (also described as electric vehicles) comprise one or more electric motor(s) which are operatively connected to the wheels of the vehicle, for the propulsion of said vehicle. Electrical energy is delivered to the electric motor(s) by an electrical energy store of the vehicle. An accumulator is generally employed as an energy store.

In many cases, electric vehicles are lighter, easier to maintain, more energy-efficient, quieter and cleaner than fossil fuel-powered vehicles. Different models of electric vehicles are now commercially available in increasing numbers. To date, however, electric vehicles have only accounted for a small proportion of new registrations. A major obstacle to the more widespread use of electric vehicles is the limited capacity of the accumulator (also described as the traction battery), and the associated restricted range of the vehicle. Moreover, the charging process in a charging station is time-consuming, and the density of charging stations is low, such that regular diversions must be undertaken for the purposes of charging.

SUMMARY

The fundamental issue addressed by the proposed solution is the extension of the range of electrically powered vehicles.

This issue is resolved by a method for the exchange of electrical energy between two or more electrically powered vehicles with features as described herein.

It is proposed that at least a first and a second vehicle are provided, each of which is preferably electrically powered (an electric vehicle). Both vehicles respectively comprise at least one electrical energy store, specifically in the form of a traction battery. By means of the energy stored in the respective energy store, the vehicles can preferably be electrically powerable, specifically by the delivery of the energy stored in the energy store to an electric motor. The energy store of the first vehicle can emit electrical energy, and the energy store of the second vehicle can receive energy. The first vehicle is moved along a first route, or is to be moved along said first route. The second vehicle is moved along a second route, or is to be moved along said second route. The first and the second routes differ from one another. Thereafter, the first route and/or the second are changed, such that both routes, further to the change, at least coincide along a route section, or along an extended routed section (in the event that for example they already coincided along a shorter route section). Thereafter, the first vehicle is steered along the first route, or along the changed first route, and the second vehicle is steered along the second route, or along the changed second route such that, in each case, the two vehicles move along the coinciding route section at a mutual distance from one another that is smaller than a predefined maximum distance. While both vehicles are moving along the coinciding route section (and specifically are steered at said mutual distance from one another along the coinciding route section) electrical energy (e.g. in a predefined quantity) is exchanged between the vehicles, and is specifically transmitted from the energy store of the first vehicle to the energy store of the second vehicle. The energy store of the first vehicle is herein specifically partially discharged, and the energy store of the second vehicle is partially or fully charged.

The maximum distance e.g. is the distance up to which, by means of an electrical coupling device on the vehicle, electrical energy can be transmitted, e.g. by electrical contact-connection and/or by inductive coupling.

The first and the second routes are specifically routes which are programed in a respective navigation system of each of the vehicles. The routes stipulate a distance which is to be travelled along over one or more roads (or other vehicle-accessible roadways). Additionally, if a road comprises a number of lanes, the routes optionally stipulate the required lane. Routes can incorporate time information, e.g. can specify the point in time at which the respective vehicle is scheduled to pass a specific point on the route. Routes run respectively from a starting point to a destination point. In the road traffic system, there are generally a number of potential routes between the same starting points and destination points. In the event of a change to the first and/or the second route, it can be provided that the starting and destination points of the first and/or the second route remain unchanged, although the altered route encompasses different roads to the original route. Alternatively or additionally, the change to the first and/or the second route comprises a change to the time information for the first and/or the second route. It is thus possible to constitute a changed route, by the vehicle passing a specific point on the route at a different point in time to that scheduled on the original route. Specifically, it is possible for the route of one of the vehicles, or both the vehicles, to be changed, not spatially, but only temporally. Alternatively, one or both routes is/are only changed spatially. Further alternatively, one or both routes is/are changed both temporally and spatially.

If an energy store is fully charged, it can receive no energy. If it is fully discharged, it can emit no energy. In general, the energy store of the vehicles assumes a state of charge which lies between a fully charged state and a fully discharged state, such that an energy store of this type can both receive and emit energy. According to the method, it can be provided that only one such first vehicle is available, the energy store of which assumes a state of charge which lies above a predefined threshold value. For example, the threshold value lies above a state of charge (calculated e.g. on the basis of information regarding the route) wherein sufficient electrical energy is stored in the energy store to propel the first vehicle along the first route (and/or along the altered first route). Alternatively or additionally, the method provides that only one such second vehicle is made available, the energy store of which assumes a state of charge which lies below a further threshold value. The further threshold value, for example, lies below a state of charge (calculated e.g. on the basis of information regarding the route), wherein insufficient electrical energy is stored in the energy store to propel the second vehicle along the second route (and/or along the altered second route). For example, the destination point of the second route is the closest charging station to the second vehicle, which is appropriate for the charging of the energy store of the second vehicle. Provision of the first and/or second vehicle optionally comprises a selection from a plurality of vehicles.

According to the method, it can be provided that, between the vehicles and/or between the vehicles and a central unit, information and/or queries are exchanged. This information relates e.g. to the states of charge of the energy stores of the vehicles and/or to one or both of the first and second routes. A query is submitted, e.g. to request a charging process. Alteration of the first and/or the second route can be executed on the basis of information exchanged. Alteration of the first and/or the second route can be executed on their own account by both vehicles. Alternatively, one of the vehicles, or the central unit, initiates the alteration of the first and/or the second route, and transmits the first and/or the second route to the first and/or the second vehicle.

The method described is inspired by the social behavior of honey bees. Worker bees who return to the colony after a fruitless search for food can generate a communication signal in order to receive nectar or honey from other bees. The concept is applied to electrically powered vehicles whereby, during travel, contact is established between two or more vehicles for the purposes of mutual charging. As this occurs during travel, time is saved, and the range of the vehicle which receives energy is extended. By way of distinction from the known charging of electric vehicles in charging stations, or by means of charging devices incorporated in the carriageway, the method described involves a peer-to-peer exchange of energy. Electric vehicles undertake the mutual exchange of surplus energy.

The first and/or the second vehicle can be employed for the conveyance of persons and/or goods, and specifically can be a passenger car.

Preferably, the first and/or the second vehicle is/are configured as (a) partially autonomously or autonomously driven vehicle(s). In some cases, autonomously driven vehicles are also described as self-driving vehicles. An autonomously driven vehicle can be steered without the intervention of a human driver, specifically along a predefined route. A partially autonomously driven vehicle can execute various functions without the intervention of a human driver, and specifically can be driven along certain types of routes, such as routes which are routed exclusively on high-speed roads, or through congestion. Many automobile manufacturers and businesses in the digital economy are developing and marketing vehicles which today are already capable of fully-autonomous driving and, in some cases, are also commercially employed for the conveyance of persons. Partially autonomous vehicles are commercially obtainable. In autonomously driven vehicles, for each journey from a starting point to a destination point, a route can be planned prior to the time of departure. The route, specifically by the central unit, can be spatially and temporally optimized (and thus altered), such that pairs of vehicles are present on a given route section. Particularly efficient algorithms for such an optimization of routes are known, e.g. in conjunction with the conveyance of multiple passengers having different starting and destination points, using the same vehicle. A particularly simple option is provided for the determination of a plurality of potential changed routes, the mutual comparison thereof, and the selection of the best route or routes. The first or second vehicle, en route to its destination point (simultaneously or sequentially), can be brought into spatial and temporal contact with a plurality of second/first vehicles.

Steering of the vehicles along the altered routes can involve a slow-down, an acceleration and/or a stoppage of the first and/or the second vehicle, in order to bring the two vehicles together, specifically for the steering thereof along the coinciding route section at a distance from one another which is smaller than the predefined maximum distance.

A third vehicle, which is specifically also an electrically powered and/or autonomously driven or partially autonomously driven vehicle, can be located in an interspace between the first and the second vehicle. According to one configuration of the method, the transmission of electrical energy from the energy store of the first vehicle to the energy store of the second vehicle is executed via the third vehicle. The third vehicle thus transmits electrical energy from the first vehicle to the second vehicle.

If a third vehicle is situated in an interspace between the first and the second vehicle, the method, prior to the step for the transmission of electrical energy from the first to the second vehicle, can include provision to the effect that the third vehicle is steered such that it is removed from the interspace between the first and the second vehicle. This can specifically be achieved by the initiation of a process for the overtaking of the first, second and/or third vehicle, by the transmission of at least one command to the first, second and/or third vehicle. The command can originate from one of the other vehicles, or from the central unit.

The above-mentioned issue is further resolved by a method for the exchange of electrical energy between two or more electrically powered vehicles (specifically during travel) according to claim 6, which can also comprise the above-mentioned process steps.

Accordingly, it is specified that an electrically powered first vehicle and an electrically powered second vehicle are provided. Both vehicles respectively comprise at least one electrical energy store, and can be electrically powered by means of energy stored in the energy store. The energy store of the first vehicle can emit electrical energy. The energy store of the second vehicle can receive energy. The first vehicle is steered along a first route, and the second vehicle is steered along a second route respectively such that both vehicles, at least along a coinciding route section, move at a mutual distance from one another. Between the first and the second vehicle, information concerning a driving state of at least one of the two vehicles is transmitted. Thereafter, the distance between the vehicles is adjusted, by the steering of the first and/or the second vehicle on the basis of the information transmitted, such that said distance (specifically during the movement of both vehicles) is greater than a predefined minimum distance and smaller than a predefined maximum distance. If, for example, said distance is initially greater than the maximum distance, it is reduced by means of adjustment until it is smaller than the maximum distance. For such time as the distance (specifically during the movement of both vehicles) is greater than the minimum distance and smaller than the maximum distance, electrical energy is transmitted from the energy store of the first vehicle to the energy store of the second vehicle e.g. by means of a coupling device for the electrical coupling of the energy stores of both vehicles.

In the interests of efficient charging, specifically by means of an inductive charging device, a small distance between the vehicles is advantageous, specifically a distance which is smaller than the maximum distance. This requires the accurate control of both vehicles which, in the present case, is permitted by the exchange of information between said vehicles. Information can be exchanged directly between the vehicles, or exchanged e.g. via the central unit. For example, the maximum distance is smaller than a customary safety distance.

Adjustment of the distance by steering the first and/or second vehicle can be based upon a model of the respective other vehicle, specifically a motion model. Parameters considered for this purpose can include e.g. the position, speed and acceleration of the other vehicle, together with, optionally, data concerning the vehicle type (engine capacity, etc.), the age of the vehicle and data concerning wear, e.g. to the brakes.

Optionally, the vehicles are arranged such that the vehicle having the higher weight runs in front.

Optionally, at least one of the two vehicles (specifically the leading vehicle) transmits information concerning an intended driving maneuver and/or adjustment of motion, and executes said driving maneuver/adjustment of motion with a specified or specifiable time delay (e.g. 50 ms). As a result, the response time of the respective other vehicle (e.g. associated with sensor latency, computer latency, radio latency and/or engine latency) can be compensated, as a result of which smaller distances can be achieved.

By means of the minimum distance, the vehicles do not engage in contact (or, optionally, are only contacted by means of the coupling device, which is not understood as contact between the vehicles; optionally, there is also no contact between the coupling devices of the vehicles). Damage to the vehicles and/or any impairments of comfort can be prevented as a result.

In one configuration, it is provided that the transmission of information with respect to at least one driving state of both vehicles respectively is executed between the first and the second vehicle. It can specifically be provided that the adjustment of the distance between the vehicles is achieved by the steering of both the first and the second vehicle, on the basis of the information transmitted.

Information transmitted with respect to a driving state can constitute information concerning an actual driving state, a target driving state and/or an anticipated driving state. Said information includes, for example, a speed, an acceleration and/or a steering angle. Information concerning the actual driving state comprises e.g. a current measured value of a speed, an acceleration and/or a steering angle. Information concerning the target driving state comprises e.g. corresponding target values in a control loop. Information concerning the anticipated driving state comprises e.g. a subsequent actual driving state, the probable existence of which at a specific future point in time is calculated on the basis of the route of the vehicle and/or by the observation of the environment of the vehicle.

Information with respect to a driving state of the first vehicle can be transmitted to the second vehicle, and information with respect to a driving state of the second vehicle can be transmitted to the first vehicle. This permits a particularly accurate control of both vehicles between the minimum and maximum distance. Transmission of information can also be respectively executed via the central unit and/or directly from vehicle to vehicle.

Optionally, the transmission of electrical energy from the energy store of the first vehicle to the energy store of the second vehicle can be executed by means of a coupling device, which transmits energy in the form of light, specifically by means of a laser beam. This permits the accommodation of particularly large distances. Moreover, it is not necessary for any moving mechanical parts to be arranged between the vehicles.

In a further development, a plurality of light barriers are arranged around the laser beam. It can thus be provided that the laser beam is switched off when one of the light barriers is obstructed.

The above-mentioned issue is further resolved by a system for the exchange of electrical energy two or more (specifically moving) electrically powered vehicles with features as described herein.

A system of this type comprises an electrically powered first vehicle, which comprises an electrical energy store, wherein the first vehicle can be electrically powered by means of energy stored in the energy store, and an electrically powered second vehicle, which comprises an electrical energy store, wherein the second vehicle can be electrically powered by means of the energy stored in the energy store. The system further comprises a coupling device, which is configured and designed for the transmission of electrical energy between the energy store of the first vehicle and the energy store of the second vehicle by means of an electrical coupling (e.g. inductive, or by way of electrical contact) of a first coupling element of the coupling device, which is arranged on the first vehicle, with a second coupling element of the coupling device, which is arranged on the second vehicle. At least one of the two coupling elements comprises an arm, which is moveable with respect to the vehicle on which said coupling element is arranged. The arm is configured to bridge a distance between the two vehicles, up to a predefined maximum distance.

In this manner, both vehicles can observe a mutual distance from one another, which is greater e.g. than the minimum distance which is to be observed for safety reasons, but nevertheless transmit energy efficiently.

Alternatively or additionally to the moveable arm, it can be provided that the coupling device is configured for the transmission of electrical energy from the energy store of the first vehicle to the energy store of the second vehicle by the emission of light, specifically in the form of a laser beam. To this end, the first vehicle comprises a laser, specifically a high-power laser, and the second vehicle comprises a photovoltaic cell. In a further development, a plurality of light barriers are arranged around the laser beam. It can thus be provided that the laser beam is switched off if one of the light barriers is obstructed. Optionally, the light barriers are encoded, e.g. according to wavelength and/or wherein radiation from the light barriers assumes differing pulse characteristics. It can be provided that the high-power laser is switched off if at least one of the encoded light beams does not engage with the respectively associated receiver. It can thus be prevented that the high-power laser is directed to a location other than the photovoltaic cell, e.g. in the event of relative movements between the vehicles. Moreover, information can be transmitted by means of radiation from the light barriers, e.g. concerning a driving state.

The two coupling elements can be magnetically and/or mechanically interlockable. Any spurious separation of the coupling elements can be prevented accordingly.

Optionally, the coupling device comprises a drive system, which is configured to move the arm relative to the vehicle on which the coupling device is mounted. For example, it can be provided that the drive system is moved the arm in accordance with a distance between the two vehicles and/or in accordance with forces and/or accelerations acting on the arm.

The arm can be a flexible arm and/or can comprise at least one pneumatic muscle. A pneumatic muscle is e.g. inflatable. An inflated pneumatic muscle is shorter and/or less flexible than a deflated pneumatic muscle. Optionally, both vehicles comprise a telescopic arm, specifically a telescopic arm having pneumatic muscles. Alternatively, or additionally, the telescopic arm can comprise a bimetal.

The coupling device can comprise at least one sensor, which is configured and designed for the measurement of forces acting on the arm and/or on the vehicle to which the arm is fitted, or of accelerations acting on the arm. The coupling device can further comprise a drive system for moving the arm. The coupling device can be configured to control the drive system in accordance with at least one value delivered by the sensor.

The first or the second coupling element can comprise a plurality of induction coils, which are arranged along a concavely or convexly configured section of a vehicle front or a vehicle tail of the first or second vehicle. Alternatively, both the first and the second coupling element respectively comprise a plurality of induction coils, which are arranged along a concavely or convexly configured section of a vehicle front or a vehicle tail of the first and second vehicle.

Efficient inductive energy transmission between the vehicles which are running one behind another can thus be achieved, in a variety of different angular positions. Specifically, at least one of the plurality of induction coils, which is closest to at least one induction coil of the respective other coupling element, is employed.

For example, the first coupling element comprises a plurality of induction coils, which are arranged along a concavely configured section of the vehicle tail of the first vehicle, and the second coupling element comprises a plurality of induction coils, which are arranged along a convexly configured section of the vehicle front of the second vehicle. Particularly efficient energy transmission is thus possible in a variety of angular positions of the vehicles, e.g. during the driving of said vehicles around a curve.

According to one aspect of the solution, a coupling device is provided, in accordance with any configuration described herein.

The above-mentioned issue is further resolved by a system for the exchange of electrical energy between two (specifically moving) electrically powered vehicles, which comprises means for the execution of the steps of any method described herein. Optionally, the system is additionally configured in accordance with one of the above-mentioned systems.

The above-mentioned issue is further resolved by an electrically powered vehicle which comprises an electrical energy store, wherein the vehicle can be electrically powered by means of the energy stored therein, together with a first coupling element and/or a second coupling element of a coupling device for the transmission of electrical energy between the energy store of the vehicle and an energy store of a further vehicle, wherein the vehicle is configured and designed to be employed in any method described herein, or in any system described herein.

BRIEF DESCRIPTION OF THE DRAWINGS

The solution is described in greater detail hereinafter with respect to embodiments, and with reference to the figures.

FIGS. 4A & 4B show two electrically powered vehicles for application in the system according to FIG. 1, which are mutually electrically coupled by means of an exemplary embodiment of an inductive coupling device.

FIGS. 5A & 5B show two electrically powered vehicles for application in the system according to FIG. 1, which are mutually electrically coupled by means of an exemplary embodiment of an electrically contacting coupling device.

FIGS. 7A & 7B show two electrically powered vehicles for application in the system according to FIG. 1, which are mutually electrically coupled by means of an exemplary embodiment of an inductive coupling device.

FIGS. 10A & 10B show two electrically powered vehicles, which are coupled by means of a coupling device for the transmission of energy, for application in the system according to FIG. 1 and in the method according to FIG. 8, wherein the coupling device comprises the arm according to FIGS. 9A to 9C.

DETAILED DESCRIPTION

Figure 1:
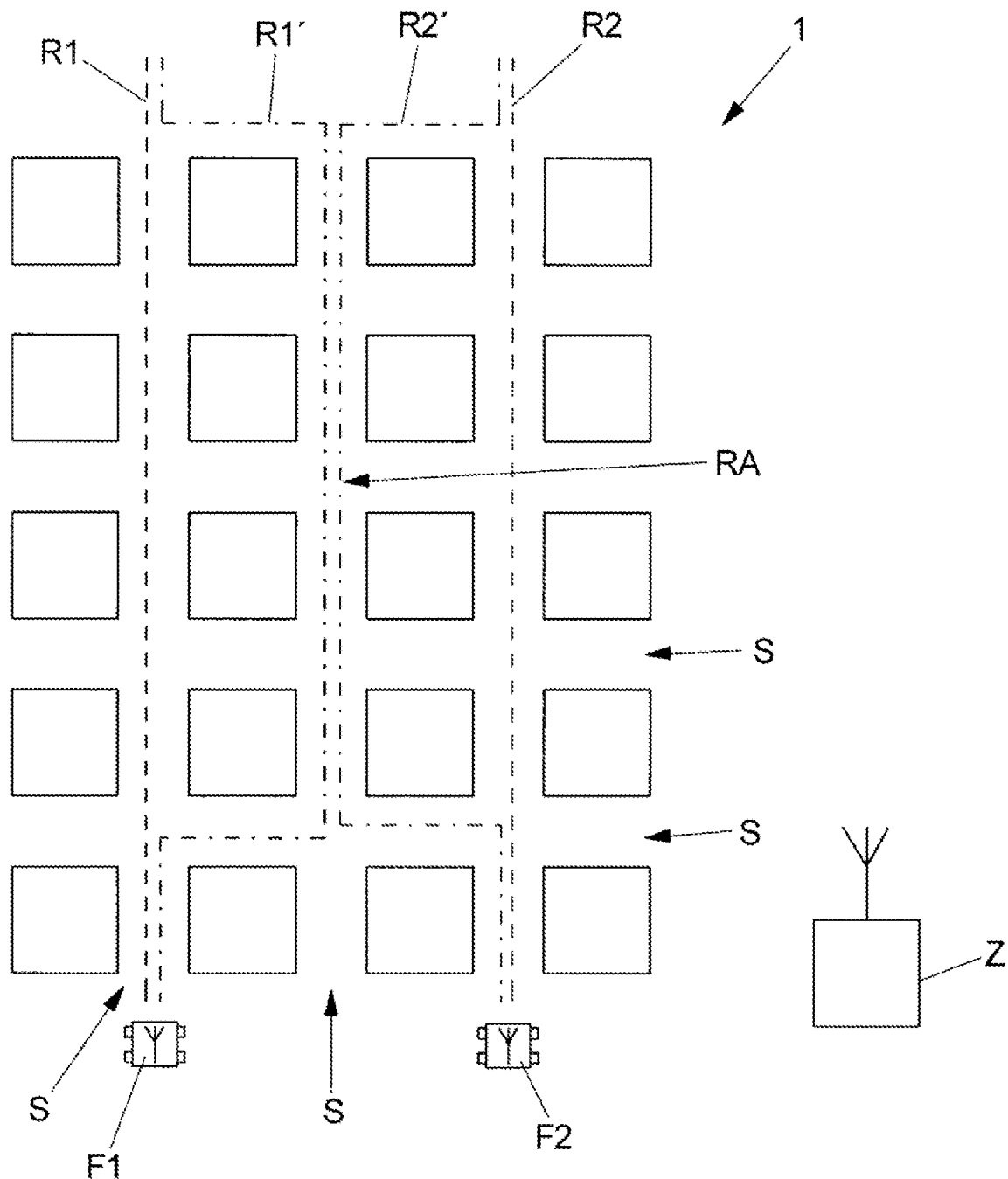
FIG. 1 shows a system for the exchange of electrical energy between two moving, electrically powered vehicles.

FIG. 1 shows a system 1, in which an electrically powered vehicle can be supplied with energy during travel, in order to increase the range of the latter. The system 1 comprises a plurality of electrically powered vehicles, also frequently described as electric vehicles, including a first vehicle F1 and a second vehicle F2. The vehicles F1, F2 each comprise at least one electrical energy store 10, as can be seen e.g. with reference to FIG. 2, which can be supplied with electrical energy and can store electrical energy. The energy store is preferably an accumulator. Electrical energy stored in the energy store can be emitted e.g. to an electric motor of the respective vehicle F1, F2, which is coupled to the wheels of the vehicle, for the electric propulsion of said vehicle. In the present example, both vehicles F1, F2 are passenger cars.

The system 1 further comprises a central unit Z. The central unit Z comprises a communication unit and a data processing unit, specifically a computer. The communication unit of the central unit is configured for wireless communication, or is operatively connected to a device for wireless data communication. For example, the communication unit of the central unit comprises a mobile radio module or a mobile radio base station.

The vehicles F1, F2 in the system 1 are autonomously driven vehicles. They can thus travel along a route, without the necessity for a human driver to steer the vehicle F1, F2. To this end, each of the vehicles F1, F2 comprises a control unit 11, which is responsible for steering (see FIG. 2). The route to be travelled can e.g. be entered in the control unit 11 by a passenger or the control unit 11 receives a predefined route via a communication unit 12 of the respective vehicle F1, F2. The communication unit 12 is configured for wireless data communication e.g. the communication unit comprises a mobile radio module. The communication units 12 of the vehicles F1, F2 can communicate with one another and/or with the communication unit of the central unit Z, and specifically exchange information in this manner. The central unit Z can communicate predefined routes to the vehicles F1, F2. The vehicles F1, F2 can moreover comprise one or more appropriate environment sensors and/or one or more cameras, which deliver information to the control unit 11. The control unit 11 steers the vehicle F1, F2 along the predefined route, wherein it employs information from the environment sensors and/or the cameras for the safe navigation through traffic.

In the present case, the first vehicle F1 moves along a predefined first route R1, and the second vehicle moves along a predefined second route R2. Both routes R1, R2 extend respectively from a starting point to a destination point. The routes run along roads S, or along other roadways which are accessible to the vehicles F1, F2. In the example according to FIG. 1, the routes R1, R2 run along schematically represented roads of a city. In the present case, the first and second routes R1, R2 are mutually distinct, and incorporate no overlapping route section.

In order to navigate the first route R1 through to the destination point, the vehicles F1, F2 require a specific quantity of energy. The exact value of this quantity of energy is dependent upon a number of characteristics including, for example, the course of the route, the actual density of traffic, weather conditions, etc.. For these parameters, estimated values are available, which can be calculated on the basis of map data which are saved in the vehicles F1, F2 and/or in the central unit Z, and/or on the basis of data provided by the vehicles F1, F2 in the system 1 or e.g. by other vehicles. This calculation can be executed by the vehicles F1, F2 in the system 1, or by the central unit Z. With reference to the estimated quantity of energy required, a threshold value for the state of charge of the energy store 10 of each vehicle F1, F2 is defined. If the actual state of charge exceeds the threshold value, the vehicle F1, F2 has a surplus of stored energy, and is able to emit energy. If the actual state of charge lies below the threshold value (or a further threshold value), the vehicle F1, F2 has a shortfall of stored energy, and will need to take on energy before reaching its destination point.

In the present case, the first electric vehicle F1 has a surplus of stored energy, and the second vehicle F2 has a shortfall of energy. Customarily, the second vehicle F2 would need to incorporate an intermediate stop at a charging station in its second route R2, or even alter its route, in order make such an intermediate stop possible. This is wasteful of time, and also potentially of energy. Potentially, the distance to the nearest charging station may even be such that it cannot be reached with the remaining energy or within the associated range, such that it may even be necessary for the vehicle to be towed.

By means of the system 1 according to FIG. 1, such disadvantages can be avoided, wherein the range of the second vehicle F2 is extended by the charging of the energy store 10 thereof by another vehicle, in this case the first vehicle F1.

The vehicles F1, F2 communicate their states of charge to the central unit Z. The central unit Z further calculates the threshold values, or also obtains these from the vehicles F1, F2. Alternatively or additionally, the vehicles F1, F2 communicate an energy shortfall and/or an energy surplus to the central unit Z. The central unit Z calculates an altered first route R1' and an altered second route R2', each of which preferably assumes the same starting and destination points as the first or second routes R1, R2. The changed routes R1', R2' incorporate a coinciding route section RA. On the coinciding route section RA, the changed routes R1', R2' cover the same road(s). The changed routes R1', R2' incorporate both spatial and temporal information. Temporal information specifies at which point in time a specific point on the changed route R1', R2' is to be passed.

The system 1 can comprise a plurality of vehicles, from which it can select a pair comprised of a first and a second vehicle, the routes of which show exceptionally good potential for mutual matching.

The altered routes R1', R2' are transmitted by the central unit Z to the vehicles F1, F2. The vehicles F1, F2 are steered along the changed routes R1', R2'. On the coinciding route section RA, they move in proximity to one another. Changing of the routes can be executed such that the two vehicles F1, F2 share the longest possible (common) coinciding route section RA. In the optimum case, the two vehicles F1, F2 merge into the traffic flow such that, by the start of this coinciding route section RA, they are already driving one behind another.

Figure 2:
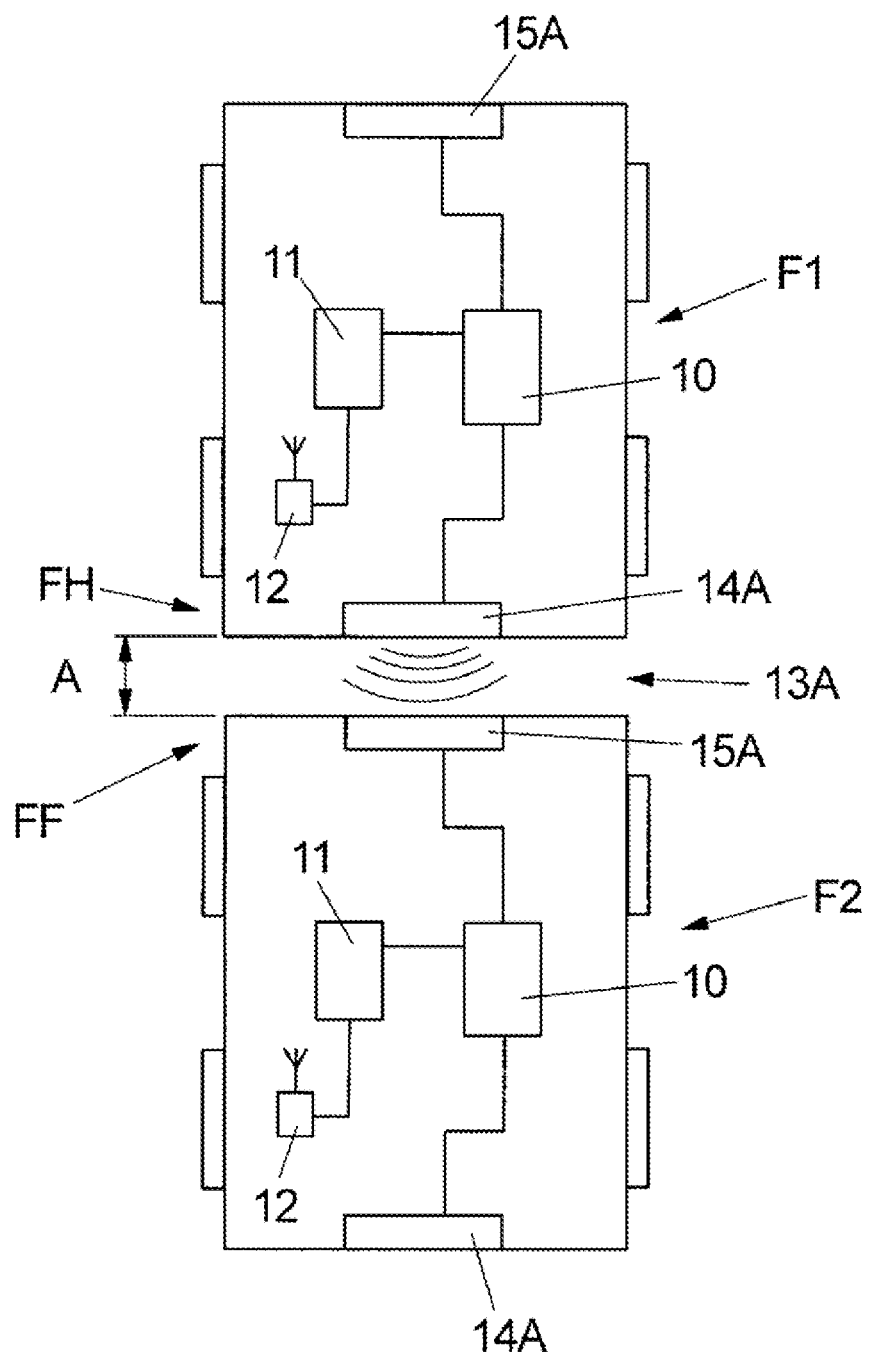
FIG. 2 shows two electrically powered vehicles for application in the system according to FIG. 1, which are mutually electrically coupled by means of an exemplary embodiment of an inductive coupling device.

As can specifically be seen by reference to FIG. 2, the system 1 comprises a coupling device 13A for the transmission of electrical energy between the vehicles F1, F2. The coupling device 13A according to FIG. 2 is configured as an inductive coupling device. The coupling device 13A comprises a first coupling element 14A, which is arranged on the vehicle tail FH of each of the vehicles F1, F2, and a second coupling element 15A, which is arranged on the vehicle front FF of each of the vehicles F1, F2. If a first coupling element 14A and a second coupling element 15A are positioned at a distance A from one another which is smaller than a predefined maximum distance (e.g. 2 meters, 1 meter, 50 cm or 20 cm), they can exchange energy by induction. To this end, each of the coupling elements 14A, 15A comprises at least one induction coil.

The induction coil of the first coupling element 14A generates an alternating magnetic field. By the principle of mutual induction, this alternating magnetic field generates an alternating current in the induction coil of the second coupling element 15A which (specifically by the use of a rectifier) is employed for the charging of the energy store 10 of the second vehicle F2. The coupling device 13A can execute resonant-inductive coupling. Resonant-inductive coupling enlarges the potential distance between the induction coils by 1 to 2 m.

According to FIG. 2, the vehicles F1, F2 are positioned one behind another on the coinciding route section RA at a distance A which is smaller than the predefined maximum distance. The energy store 10 of the first vehicle F1, via the coupling device 13A, delivers electrical energy to the energy store 10 of the second vehicle F2. The state of charge of the energy store 10 of the second vehicle F2 is increased accordingly. Energy transmission can be executed under stationary conditions (e.g. in congestion or at traffic lights) and/or in motion.

The second vehicle F2 is thus charged during travel, and its range is increased. Specifically, if the first vehicle F1 cannot emit sufficient energy, it is possible to repeat the process with a further vehicle in the system 1 which has an energy surplus.

Rather than alter both routes R1, R2, it is also possible to change only one of the two routes, e.g. if one the vehicles, on the grounds of its state of charge and/or on the grounds of time constraints is not ready to change its route.

In an alternative configuration, one or more of the vehicles F1, F2 can also assume the functions of the central unit Z.

If the changed routes R1', R2' are not sufficiently precise, or if e.g. the density of traffic does not permit this, it can occur that the two vehicles F1, F2 are close to one another, but not behind one another on the coinciding route section RA. In such cases, the following process steps are possible, in order to achieve the desired position of the vehicles F1, F2 relative to one another.

For example, the first vehicle F1 is driving ahead of the second vehicle F2, and one or more further road users are present between the vehicles F1, F2. If the coinciding route section RA comprises a multi-lane carriageway, the first vehicle F1 could drive somewhat slower, and the second vehicle F2 could drive somewhat faster, such that vehicles present between the vehicles F1, F2 either overtake the first vehicle F1, or are themselves overtaken by the second vehicle F2. An overtaking process is thus initiated or induced. In the case of a single-lane carriageway, it is possible to wait until the road user(s) positioned between the first and the second vehicle F1, F2 has (have) turned off the coinciding route section RA, or until the carriageway widens. Initiation of the overtaking process and/or waiting for a turn-off can be established and triggered by communication between the vehicles F1, F2 and/or the intervening road users and/or by communication with the central unit Z. The intervening road user can be a third vehicle F3 in the system 1, which can communicate with the first and second vehicles F1, F2 and/or with the central unit Z.

If, for example, the carriageway remains single over a major proportion of the coinciding route section and the intervening road user(s) between the vehicles F1, F2 does (do) not intend, or is (are) not ready to turn off from this section, various process steps can be executed. The first vehicle F1 can be instructed, for a short waiting period (e.g. less than 30 s) to make a stop in a designated stopping place (e.g. a parking space, an entrance, etc.). This solution might be preferred, if a large number of further vehicles are present between the first and the second vehicle F1, F2.

Additionally, by means of communication with the vehicles which are located between the first and the second vehicle F1, F2 (e.g. in return for a small payment), an overtaking of these vehicles might be purchased or requested. An intervening vehicle will then provide a gap between itself and the first vehicle F1, into which the second vehicle F2 can overtake.

Figure 3:
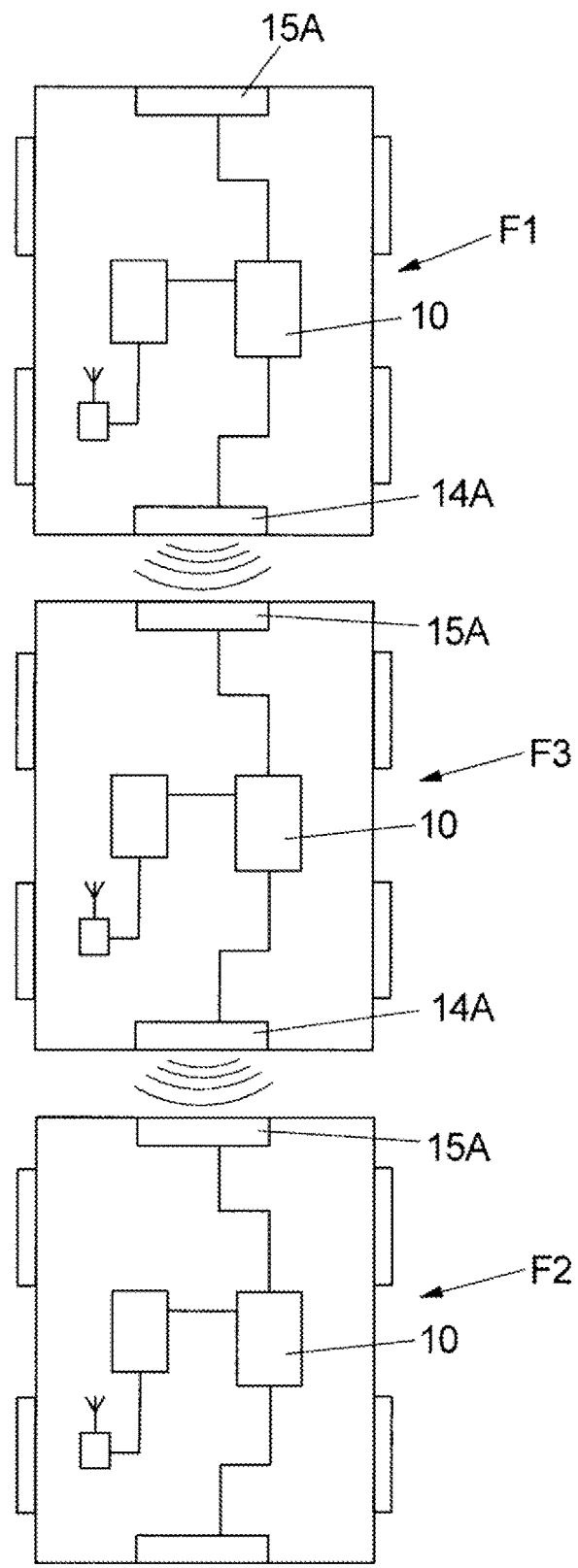
FIG. 3 shows three electrically powered vehicles for application in the system according to FIG. 1, which are mutually electrically coupled by means of a plurality of inductive coupling devices.
Figure 6A:
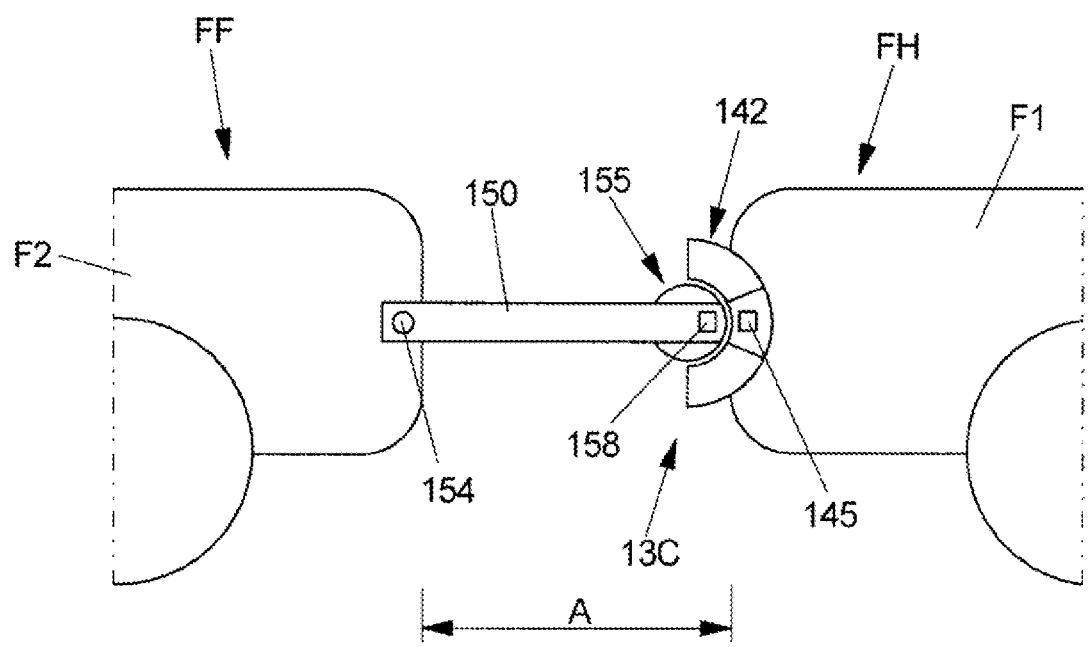
FIGS. 6A & 6B show the coupling device according to FIGS. 5A and 5B.
Figure 6B:
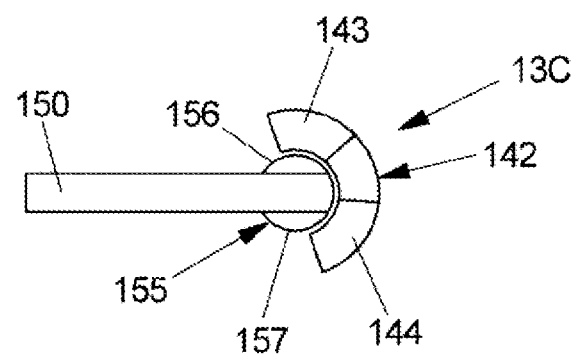

As shown in FIG. 3, it is further possible for a third vehicle F3 in the system 1 which is situated between the first and second vehicles F1, F2 to transmit electrical energy from the first vehicle F1 to the second vehicle F2. The third vehicle F3 comprises a first and a second coupling element 14A, 15A, by means of which it can receive energy from the first vehicle F1 and can deliver energy to the second vehicle F2. The third vehicle F3 functions as a passive transmission partner. This functionality is transferable to a larger number of vehicles, in order to constitute a vehicle train in which one or more of said vehicles are supplied with energy by one or more other vehicle(s).

Optionally, one of the plurality of vehicles F1, F2, F3 which are electrically coupled by means of the coupling devices 13A, in this case the first vehicle F1, can supply electrical energy to a plurality of the other vehicles F2, F3.

As an alternative to an inductive coupling of the vehicles F1-F3, coupling by means of direct electrical contact (i.e. by the galvanic connection of electrical conductors) between the vehicles F1-F3 is also possible, as described hereinafter with reference to FIGS. 4A to 6B.

FIGS. 4A and 4B show a first vehicle F1 and a second vehicle F2 in the system 1 according to FIG. 1, which only differ from the vehicles F1, F2 according to FIG. 2 with respect to their coupling device 13B. The coupling device 13B comprises a first coupling element 14B, which is fitted to the first vehicle F1, specifically in the example according to FIGS. 4A and 4B on the vehicle tail FH. The coupling device 13B further comprises a second coupling element 15B, which is fitted to the second vehicle F2, in the example represented on the vehicle front FF. Both coupling elements 14B, 15B respectively comprise an induction coil 140, 152. The induction coils 140, 152 can be mutually inductively coupled for the transmission of electrical energy. Coupling over the shortest possible distance is particularly efficient.

The first coupling element 14B comprises a coil carrier 141, to which the induction coil 140 is attached. The coil carrier 141 is attached to the vehicle tail FH of the first vehicle F1, e.g. onto or in the fender. The coil carrier 141 is constituted, for example, in the form of a block or a pad of rubber or similar.

The second coupling element 15B comprises an arm 150. The arm 150 is moveable relative to the second vehicle F2. In the present case, the arm 150 is configured for longitudinal displacement along the longitudinal axis of the vehicle (which extends from the vehicle tail FH to the vehicle front FF). The arm 150 can thus be retracted and deployed in the direction of travel (in relation to a straight driving trajectory). In this manner, the arm 150 can offset and bridge a distance A between the vehicles F1, F2 which varies during the travel of said vehicles F1, F2, in order to permit the achievement of the shortest possible distance between the induction coils 140, 152. On the end of the arm 150 which is averted from the second vehicle F2, a coil carrier 153 is arranged. The induction coil 152 of the second coupling element 15B is attached to the coil carrier 153. The coil carrier 153 is mounted on the arm 150 so as to be pivotable about an articulated joint 151. If the second vehicle F2 is situated on a flat road, the pivoting axis of the articulated joint 151 is essentially oriented perpendicularly to the road. By means of the pivoting facility, the two induction coils 140, 152 can continue to be mutually oriented even in a curved driving trajectory (see FIG. 4B), in order to permit the achievement of the maximum coupling efficiency.

By means of the arm 150, physical contact between the two coupling elements 14B, 15B can be constituted, such that induction coils 140, 152, in the interests of efficient energy transmission, are only spaced e.g. a few millimeters from one another.

The arm 150 further permits the interception of any impacts due to components such as shock-absorbers or yielding articulated joints, without the measurement of distance and any subsequent adjustment (also described as "passive compliance").

The coupling device 13B further comprises a sensor 16, e.g. in the form of a force, acceleration or distance sensor, which is configured to measure a force and/or an acceleration acting on the arm 150, or to measure the distance A between the vehicles F1, F2.

The coupling device 13B also comprises a drive system 17, in order to move the arm 150 relatively to the second vehicle F2 and/or to pivot the coil carrier 153 about the articulated joint 151. Depending upon the distance A and/or the relative mutual angular position of the vehicles F1, F2, the arm 150 and/or the coil carrier 153 can be moved by means of the drive system 17, for the purposes of the active orientation of the induction coil 152 of the second coupling element 15B vis-à-vis the induction coil 140 of the first coupling element 14B (also described as "active compliance"). The drive system 17 can be controlled in accordance with measured values from the sensor 16.

The coupling device 13B further comprises an interlocking mechanism, for the mutual mechanical interlocking of the two coil carriers 141, 153, e.g. in a positive locking and/or non-positive locking manner. The interlocking mechanism can be controlled in accordance with measured values from the sensor 16, e.g. opened i.e. unlocked in the event of an overshoot of a predefined force. In the present case, the interlocking mechanism comprises a hook 159 on the second coupling element 15B which, for the closure of the interlocking mechanism, engages with a counter-bearing 146 on the first coupling element 14B.

FIGS. 5A and 5B show a first vehicle F1 and a second vehicle F2 in the system 1 according to FIG. 1, which only differ from the vehicles F1, F2 according to FIG. 2 with respect to their coupling device 13C. The coupling device 13C permits coupling by direct electrical contact. The coupling device 13C comprises a first coupling element 14C, which is fitted to the first vehicle F1, specifically in the example according to FIGS. 5A and 5B on the vehicle tail FH. The coupling device 13C further comprises a second coupling element 15C, which is fitted to the second vehicle F2, in the example represented on the vehicle front FF. Both coupling elements 14C, 15C respectively comprise an electrical contact. For the transmission of electrical energy, the electrical contacts of the coupling elements 14C, 15C are brought into mutual contact. Direct electrical contact of this type can exhibit very low losses in the transmission of electrical energy.

For the purposes of passive or active compliance, the coupling device 13C comprises a moveable arm 150, a sensor 16 and a drive system 17, and is capable of longitudinal displacement, as per the coupling device 13B according to FIGS. 4A and 4B.

For the purposes of electrical contact-connection, the first coupling element 14C comprises a coupling socket 142 (or a socket in general) and the second coupling element 15C comprises a coupling ball 155 (or a plug-in element in general). The coupling ball 155 can engage with the coupling socket 142 in a contact-connected manner, by means of the movable arm 150.

If the coupling ball 155 and the coupling socket 142 are mutually engaged, the coupling socket 142 partially encloses the coupling ball 155. The coupling ball, in combination with the arm 150, is pivotable in the coupling socket 142 over a specific angular range. This permits a tolerance margin in the relative orientations of the vehicles F1, F2 to one another, for example on curves or on hills. The electrical contacts 143, 144 of the coupling socket 142 and the electrical contacts 156, 157 of the coupling ball 155 extend, in cross-section, over a specific angular range (e.g. more than 10, more than 20 or more than 40 degrees) of the coupling socket 142 or the coupling ball 155, as can specifically be seen with reference to FIGS. 6A and 6B, and are each specifically spatially separated from one another by means of an insulator, which spans a somewhat larger angular range. Electrical contact can thus be maintained, in the event of pivoting within said angular range.

If the arm 150 is operated with passive compliance, it can be deployed from the second vehicle F2 and, then, by means of vehicle movements, inserted into the socket, and retained therein. The arm 150 can passively offset a variation in the distance A between the vehicles F1, F2, and specifically compensate a convergence or divergence of the vehicles F1, F2. A spring mechanism can ensure that contact with the first vehicle F1 is maintained, even where the distance A increases.

If the arm 150 is equipped and operated with active compliance, it can additionally move independently in the socket, with no adjustment in the vehicle position and, if required, can execute the tracking of mutual changes in the relative position of the vehicles F1, F2.

The coupling device 13C further comprises a magnetic interlocking mechanism (alternatively or additionally, it might also incorporate a mechanical interlocking mechanism, as per the coupling device 13B according to FIGS. 4A, 4B). To this end, an electromagnet 158, 145 is arranged on the coupling ball 155 and/or the coupling socket 142, by the activation of which the coupling elements 14C, 15C are mutually magnetically interlocked.

In order to ensure the robust transmission of energy, even in the event of relative movements or vibrations, the coupling socket 142 can incorporate an array of carbon brushes. These are compressed against the coupling ball 155 e.g. by means of springs, such that electrical contact is consistently maintained.

FIGS. 7A and 7B show a first vehicle F1 and a second vehicle F2 for the system 1 according to FIG. 1, which only differ from the vehicles F1, F2 according to FIG. 2 with respect to their coupling device 13D. The coupling device 13D permits inductive coupling. The coupling device 13D comprises a first coupling element 14D, which is fitted to the first vehicle F1, specifically in the example according to FIGS. 7A and 7B on the vehicle tail FH. The coupling device 13D also comprises a second coupling element 15D, which is fitted to the second vehicle F2, in the example represented on the vehicle front FF.

The vehicle front FF of the second vehicle F2 and the vehicle tail FH of the first vehicle F1 assume complementary shapes. The vehicle front FF of the second vehicle F2 is configured to a convex design. The vehicle tail FH of the first vehicle F1 is configured to a concave design. Along the vehicle front FF of the second vehicle F2 and along the vehicle tail FH of the first vehicle F1, a plurality of induction coils 152, 140 of the coupling device 13D are arranged. Induction coils 152 of the coupling element 15D of the second vehicle F2 constitute a convex arrangement. Induction coils 140 of the coupling element of the first vehicle F1 constitute a matching concave arrangement. For example, the induction coils 140, 152 are arranged along correspondingly shaped fenders of the vehicles F1, F2, specifically along the full width of the fenders.

Accordingly, even in curved driving trajectories, a particularly strong inductive coupling can be ensured, as a plurality of induction coils 140, 152 are arranged in direct mutual opposition at all times.

The greater the distance of the coupling elements of the inductive coupling devices 13A, 13B, 13D from one another, the lower the efficiency of the inductive charging process. A distance which exceeds the range of the arm 150 prevents any direct electrical contact-connection of the coupling device 13C according to FIGS. 5A-6B. The closer the two vehicles F1, F2 move towards one another, the greater the risk of a collision of the two vehicles F1, F2, e.g. as a result of a sudden braking maneuver by the leading vehicle.

Consequently, the mutual distance A of the vehicles F1, F2 from one another should be smaller than a predefined maximum distance Amax and greater than a predefined minimum distance Amin. This is permitted by the following process steps, illustrated in FIG. 8:

In step S200, the electrically powered first vehicle F1 is provided, which comprises the electrical energy store 10, wherein the first vehicle F1 can be electrically powered by means of energy stored therein, and wherein the energy store 10 can emit electrical energy, and specifically features an energy surplus.

In step S201, the electrically powered second vehicle F2 is provided, which comprises the electrical energy store 10, wherein the second vehicle F2 can be electrically powered by means of the energy stored therein, wherein the energy store 10 can receive electrical energy, and specifically features a shortfall of energy.

In step S202, the first vehicle F1 is steered along the first route R1 and the second vehicle F2 is steered along the second route R2, such that both vehicles F1, F2, at least along the coinciding route section RA, move relative to one another at the distance A.

In step S203, information with respect to a driving state of at least one of the two vehicles F1, F2 is transmitted between the first and the second vehicle F1, F2. This is achieved e.g. by means of direct communication between the vehicles F1, F2 and/or by means of communication via the central unit Z. Optionally, by reference to the information transmitted, a prediction of the driving state or the driving behavior of one of the two, or of both vehicles F1, F2 is calculated.

In step S204, the distance A between the vehicles F1, F2, due to the steering of the first and/or the second vehicle F1, F2 on the basis of the information thus transmitted, is adjusted or set such that the distance A during the movement of both vehicles F1, F2 along the coinciding route section RA is greater than the predefined minimum distance Amin and smaller than the predefined maximum distance Amax.

In step S106, electrical energy is then transmitted from the energy store 10 of the first vehicle F1, by means of the respective coupling device 13A-13D, to the energy store 10 of the second vehicle F2, while the distance A during the movement of both vehicles F1, F2 along the coinciding route section RA is greater than the minimum distance Amin and smaller than the maximum distance Amax.

In step S204, one of the vehicles (e.g. the second vehicle F2) can measure its distance to the other vehicle and, in accordance with the results of this measurement, can adjust its relative position to the other vehicle. Accordingly, no exchange of information is required, and step S203 is optional. During travel, however, a plurality of latencies are then cumulatively combined, specifically the following: a sensor latency, a cognitive latency (pending the initiation of a change in behavior of the vehicle) and an engine latency (further to which the change in behavior is detectable) of the other vehicle, together with a sensor latency, a cognitive latency and an engine latency of the vehicle which adjusts the distance.

In order to reduce the response time of the second vehicle F2, the first vehicle F1 e.g. can transmit actual states, e.g. with respect to its speed and/or acceleration to the second vehicle F2, thereby obviating the measurement thereof by the latter, and the associated latency. Alternatively or additionally, the second vehicle F2 delivers current or future control commands (e.g. target values for a speed and/or acceleration) for the second vehicle F2. The second vehicle F2, by reference to these control commands and by means of a predictive model, can calculate an anticipated actual state of the first vehicle F1. Input parameters of the predictive model include e.g. a speed and an acceleration, and additionally, optionally, a gradient of the carriageway and/or wind and weather conditions. The first vehicle F1 can execute the delayed implementation of its notified control commands by a predefined or predefinable latency period, in order to further improve the synchronization of the vehicles F1, F2.

Optionally, the first vehicle F1, by means of a model, calculates a prediction of future control commands (on its own account, e.g. for the coming seconds). These predicted control commands can be transmitted by the first vehicle F1 to the second vehicle F2. By reference to these predicted control commands, the second vehicle F2 can minimize fluctuations in the vehicle distance.

Optionally, the first vehicle F1, for each time increment, refreshes a model of its future actions (specially control commands). This model might (concurrently) incorporate a plurality of different scenarios and a probability of the execution thereof (e.g. an overtaking maneuver, a braking maneuver or a change of lane, by way of corresponding movement trajectories, inclusive of speeds and accelerations, etc., with their respective probability over time). The second vehicle F2, on the basis of its own sensor data or sensor data relayed by the first vehicle F1, and by the application of the model of the first vehicle F1, might calculate a prediction of which predicted control commands are to be transmitted by the first vehicle F1 to the second vehicle F2.

In step S204, for example, the second vehicle F2 can thus adjust the distance A to the first vehicle F1 by predicting the movement of the first vehicle F1. The adjustment of the second vehicle F2 is executed e.g. by means of the communication by the first vehicle F1 to the second vehicle of a real-time prediction of its driving behavior or driving state. This can include various information, specifically a hierarchy of information, such as e.g. a prediction of vehicle acceleration (positive or negative), for example in the respective next tenth of a second, a planned change of direction, e.g. over the next few seconds, and/or sensor data or road characteristics which permit the prediction of vehicle behavior or a drive state, such as e.g. potholes which are logged in a memory of one of the vehicles F1, F2, or of the central unit Z.

Alternatively or additionally, the first vehicle F1 can adjust the distance A to the second vehicle F2, wherein it controls the second vehicle F2. As the leading vehicle, the first vehicle F1 is in possession of the relevant information required for the control of the vehicle train F1, F2. Driving control of the second vehicle F2 can thus be surrendered to the first vehicle F1. The second vehicle F2 can here receive and directly implement commands from the first vehicle F1 (specifically by way of the control of an electric motor, a brake and/or a steering angle). Optionally (and where possible), the first vehicle F1 delays its own control commands, in order to compensate any transmission latency of the commands to the second vehicle F2. The first vehicle F1, in its control of the vehicle train F1, F2, can predict the behavior of the second vehicle F2 by the employment of a previously communicated vehicle model. This vehicle model incorporates e.g. characteristic variables which permit the calculation of the behavior of the second vehicle F2, in response to given control commands, in a number of future time increments. The vehicle model can be transmitted by the second vehicle F2 to the first vehicle F1 (e.g. in the form of a handshake). The vehicle model can predict engine values with reference to corresponding anticipated and measured actual values and, optionally, can be inversely employed by the first vehicle F1 (tailoring target behavior to engine values), in order to calculate engine values for the second vehicle F2 which will result in behavior that the first vehicle F1 anticipates on its own account.

The second vehicle F2 can provide a dedicated interface, via which the first vehicle F1 communicates target values for the driving behavior or driving state of the second vehicle F2 (at a future time point) to the second vehicle F2. The second vehicle F2 can then employ a dedicated control loop (and optionally a model of its own future driving behavior or driving state) in order to achieve the target specifications of the first vehicle F1.

Optionally, both vehicles F1, F2 undertake the mutual exchange of information. The vehicles F1, F2 can share e.g. a schedule of (their own respective) future driving behavior or driving state, in order to improve their respective prediction of the driving behavior or driving state of one or both vehicles F1, F2.

Alternatively, however, it is also possible for the distance to be adjusted without the exchange of information between the vehicles F1, F2. Independently of the first vehicle F1, the second vehicle F2 can measure its distance and its relative position to the first vehicle F1, and can adjust its acceleration such that the distance remains constant. However, this can require a very rapid implementation of control commands and correspondingly necessitate high-speed sensors, i.e. having a small temporal latency and a high temporal sampling rate. Both vehicles F1, F2 can also measure and adjust the distance relative to one another.

If a vehicle identifies a shortfall of energy, it can submit a request to the central unit Z. Alternatively or additionally, the central unit Z monitors the states of charge of a plurality of vehicles and identifies, optionally in consideration of the respective route plan, a shortfall or surplus of stored energy. The system 1 then executes the following steps.

In step S100, an electrically powered first vehicle F1 is identified and provided, which comprises an electrical energy store 10, wherein the first vehicle F1 can be electrically powered by means of energy stored therein, and wherein the energy store 10 can emit electrical energy (specifically features an energy surplus), and wherein the first vehicle F1 is currently moving, or is subsequently to be moved along a first route R1, e.g. by the programming of a navigation system.

In step S101, a second electrically powered vehicle F2 is identified and provided. This is, for example, the vehicle which has submitted the request to the central unit Z. The second vehicle comprises an electrical energy store 10, wherein the second vehicle F2 can be electrically powered by means of energy stored therein, and wherein the energy store 10 can receive electrical energy (and specifically features a shortfall of energy), and wherein the second vehicle F2 is moving, or is to be moved along a second route R2.

Naturally, step S101 can also be executed prior to step S100. Depending upon the current location and/or the course of the second route R2 of the second vehicle F2, a first vehicle F1 can then be identified (e.g. selected from a large number of potential first vehicles) and provided which, e.g. assumes a similar current location, a similar course of the first route R1 and/or the energy store of which 10 has a sufficient state of charge.

In the optional step S102, the first route R1, and/or in an optional step S103, the second route R2 is changed such that both routes R1, R2 or, if one or both routes have been changed, the changed route(s) R1', R2' at least coincide along a route section RA or along an extended route section. Alternatively, such vehicles can be identified in steps S100, S101, and provided as first and second vehicles F1, F2 which already assume routes R1, R2 having a coinciding route section RA.

In step S104, the first vehicle F1 is steered along the first route R1 or, if the latter has been changed, along the changed first route R1', and the second vehicle F2 is steered along the second route R2 or, if this has been changed, along the changed second route R2' such that, specifically in each case, the two vehicles F1, F2 move along the coinciding route section RA at a distance A from one another which is smaller than a predefined maximum distance Amax. The maximum distance Amax is e.g. 50 cm, 1 m, 2 m or 5 m. Optionally, vehicles situated between the vehicles F1, F2, by means of the initiation already mentioned above of at least one overtaking maneuver, are removed from the interspace (step S105).

In step S106, electrical energy is move from the energy store 10 of the first vehicle F1 on F1, F2 moving along the coinciding route section RA and/or situated on the coinciding route section RA. Optionally, this is executed via one or more vehicles F3 which are situated between the first and the second vehicle F1, F2.

In this manner, it is possible to charge a vehicle without an intermediate stop, thereby increasing the range of said vehicle.

In order to increase the efficiency of energy transmission (or for the mutual convergence of the vehicles F1, F2 to a distance A which can be bridged by means of the arm 150), the method can proceed from step S104 or step S105 to step S203.

Steps S203, S204, S106 and/or S104 can be executed simultaneously.

Figure 8:
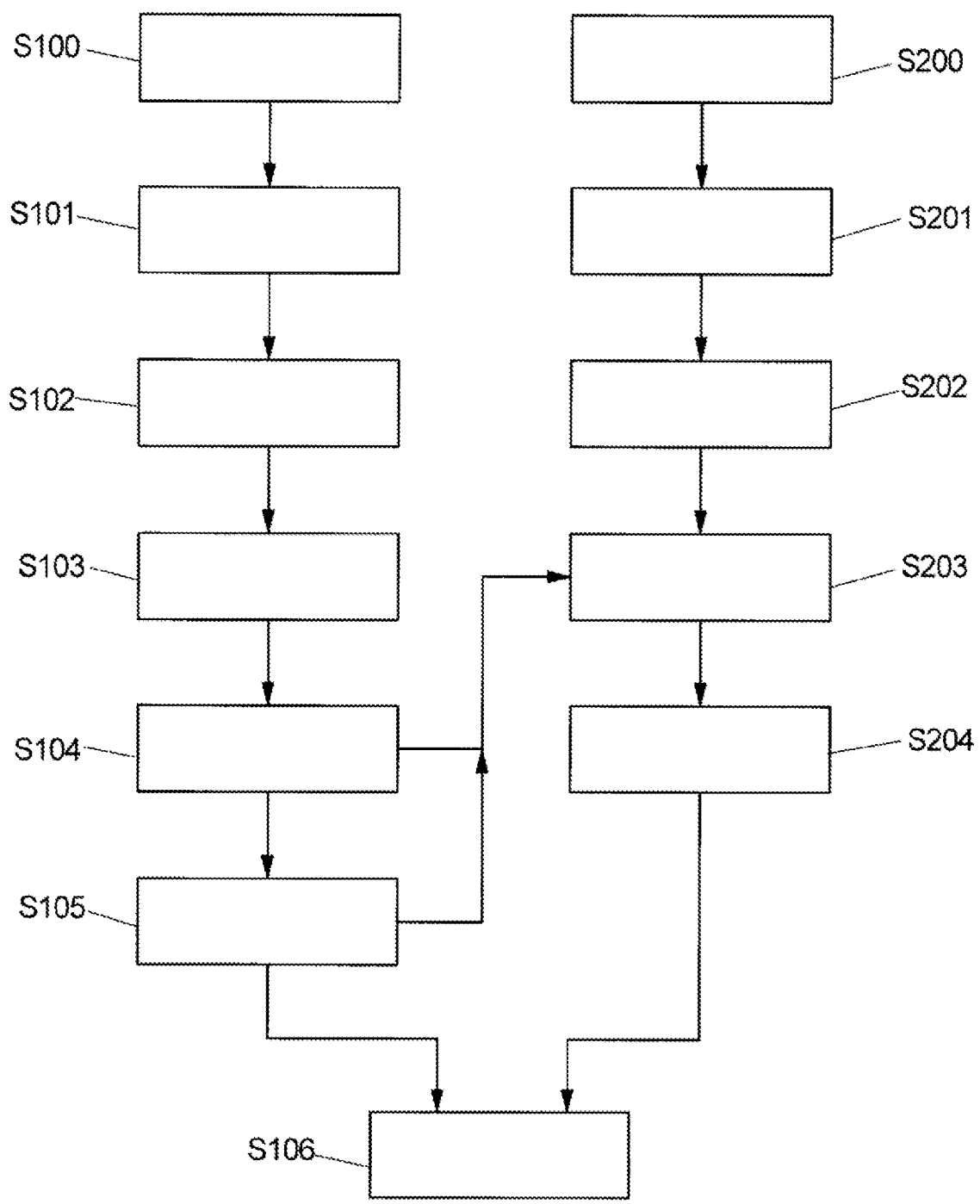
FIG. 8 shows a flow diagram of a method for the exchange of electrical energy between two moving electrically powered vehicles.

The system 1 comprises means for executing the process steps illustrated in FIG. 8, specifically at least the first and second vehicle F1, F2, at least one of the coupling devices 13A-13D described herein, and/or the central unit Z.

In general, both vehicles can comprise both a first coupling element 14A-14D and a second coupling element 15A-15D. The arrangement of the first coupling element 14A-14D and of the second coupling element 15A-15D on the first and second vehicle F1, F2 can also be interchanged vis-à-vis the arrangements illustrated in FIGS. 2 to 7B.

Optionally, the first and the second vehicles F1, F2 are essentially of an identical design.

Figure 9A:
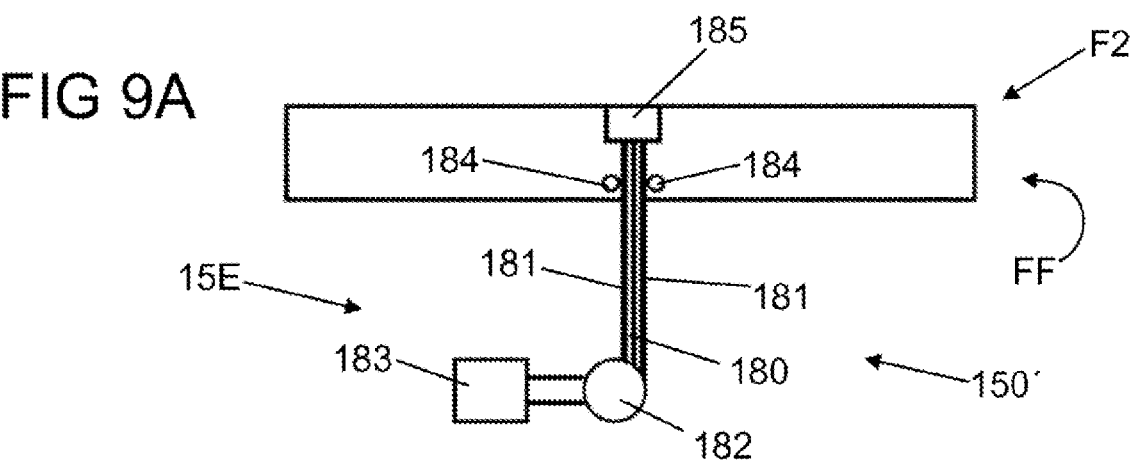
FIGS. 9A to 9C show a coupling element with a telescopic arm, having pneumatic muscles.
Figure 9B:
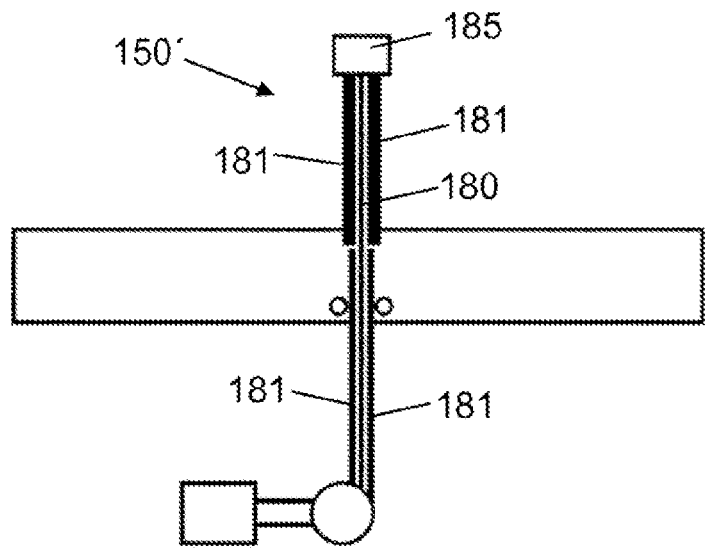
Figure 9C:
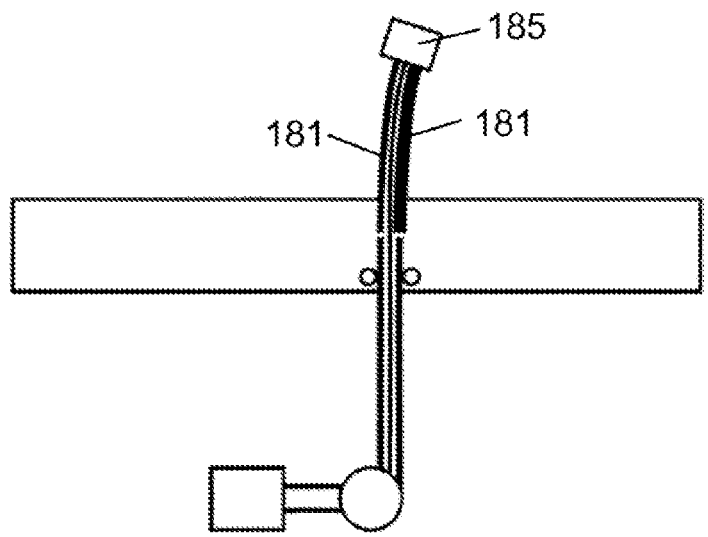

FIGS. 9A to 9C show an exemplary embodiment of a (second) coupling element 15E of a coupling device for a vehicle F2, e.g. a vehicle in the system according to FIG. 1 and/or for employment in the method according to FIG. 8.

The coupling element 15E is arranged on the vehicle front FF (specifically on the fender) of the vehicle F2. The coupling element 15E comprises a telescopic arm 150'. The telescopic arm 150' comprises a coupling head 185. The coupling head 185 is configured for the transmission of energy. Optionally, the coupling head 185 is configured as per the coil carrier 153 according to FIGS. 4A and 4B. Alternatively, it is possible for the coupling head 185 to be configured as per the coupling ball 155 according to FIGS. 5A to 6B.

The coupling head 185 is fitted to the end of a cable 180. The cable 180 is an electric cable 180. The cable 180 can be wound onto a cable reel 182 and paid-out from said cable reel 182. The cable reel 182 optionally comprises a motor, for the optional wind-up or pay-out of the cable. Guide rollers 184 on the fender of the vehicle F2 guide the cable 180. Optionally, the guide rollers 184 are motorized, and are specifically configured for the deployment of the cable 180 (and optionally, additionally, for the retraction thereof).

Whereas FIG. 9A represents a state in with the cable 180, together with the coupling head 185, is retracted, FIGS. 9B and 9C respectively represent a state in which the cable 180, together with the coupling head 185, is at least partially deployed.

The arm 150' further comprises pneumatic muscles 181. The pneumatic muscles 181 are inflatable by means of a compressor 183, e.g. using air or another fluid. The compressor 183 is fitted to the vehicle F2. The pneumatic muscles 181 are deflatable by means of the compressor 183 and/or additional controllable valves, i.e. air (or fluid in general) can be released from the pneumatic muscles 181.

Figure 11:
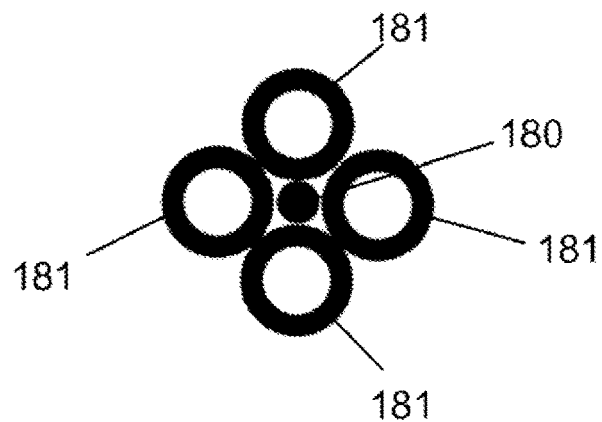
FIG. 11 shows a cross-section of the arm according to FIGS. 9A to 10B.

The pneumatic muscles 181 are arranged longitudinally and parallel to the cable 180. Specifically, the pneumatic muscles 181 are attached to the cable 180. In the example according to FIG. 11, four pneumatic muscles 181 are arranged around the cable 180, wherein another number is also conceivable. In general, the arm 150' can comprise at least one, specifically two or more pneumatic muscles 181. If the arm 150' comprises only one pneumatic muscle 181, this is fitted e.g. on the upper side of the cable 180 (in relation to a vehicle which is positioned on a flat base surface.

An uninflated pneumatic muscle 181 is flexible, e.g. of similar flexibility to the cable 180. The cable 180 can then be wound onto the cable reel 182 in combination with the pneumatic muscles 181. Prior to winding-on, or during winding-on, the pneumatic muscles 181 (insofar as they are inflated) are evacuated. Given that, depending upon the configuration of the pneumatic muscles 181, this can require a specific time interval, the cable reel 182 can be configured such that it can tension the wound-on arm 150' (on the inner side).

Optionally, an inflated pneumatic muscle 181 is essentially rigid. Specifically, an inflated pneumatic muscle 181 is less flexible than in the uninflated state. According to FIG. 9B, all the pneumatic muscles 181 on the section of cable 180 which is deployed from the fender are inflated. The inflated pneumatic muscles 181 hold the cable 180 straight, e.g. in order to couple the coupling head 185 with a coupling head on another vehicle.

A pneumatic muscle 181, moreover, in the inflated state, is shorter than in the uninflated state.

For example, each pneumatic muscle 181 comprises a (flexible) hose, which contracts under pressure. The hose is enclosed e.g. in fibers, which are arranged in a rhomboid-pattern weave. Optionally, a pneumatic muscle comprises one such enclosed hose or, alternatively, a plurality of such enclosed hoses (corresponding to biological muscle fibers).

If the pneumatic muscles 181 on a section of cable 180 are inflated to differing degrees, or where individual or a plurality of, but not all the pneumatic muscles 181 are inflated, the cable 180 will be curved, c.f. FIG. 9c, wherein the pneumatic muscle 181 represented on the right-hand side of the image is inflated, but that arranged opposite is not.

As can specifically be seen in FIG. 9B, the arm 150' comprises a plurality of pneumatic muscles 181, which are arranged one behind another along the longitudinal extension of the cable 180. The cable 180 can thus be curved e.g. into an S-shape. It can provided that pneumatic muscles 181 are arranged along the entire deployable length of the cable 180.

FIGS. 10A and 10B show the vehicle F2 according to FIGS. 9A to 9C as a second vehicle F2, together with a first vehicle F1 which is coupled thereto by means of the coupling device 13E for the transmission of energy.

The coupling element 15E can be equipped with sensors, and/or can establish the relative position of the first vehicle F1 with respect to to the second vehicle F2 and, in accordance therewith, can actuate at least one pneumatic muscle. This can be executed such that the coupling head 185 is oriented toward coupling head 185 of the other vehicle F1. Alternatively or additionally, the first and/or the second vehicle F1, F2 are steered such that the coupling heads 185 are oriented in relation to one another. Both coupling heads 185 are then e.g. magnetically mutually interlocked.

Optionally, one or more pneumatic muscles 181 can be replaced by a static antagonist, e.g. in the form of a flexible metal strip, which is optionally pre-tensioned in one direction. In each case, one pneumatic muscle 181, for example, with respect to the cable 180, is arranged in opposition to a static antagonist.

Coupling of the coupling heads 185 by means of the telescopic arm 150' can be executed e.g. with the vehicles F1, F2 at a standstill (e.g. at a red light) or, alternatively, during travel which, to this end, is optionally limited to a predefined maximum speed. A distance is thus set between the vehicles F1, F2, which can be bridged by the arm 150', e.g. 2 m.

Optionally, the pneumatic muscles 181 can be released after the coupling of the coupling heads 185. Accordingly, the arm 150' is flexible, and permits a degree of relative movement between the vehicles F1, F2 (c.f. specifically FIG. 10B). The cable 180 can optionally be capable of being paid-out further after coupling, e.g. for the provision of a greater safety distance. Optionally, the cable reel 182 is pre-tensioned, and prevents any sagging of the cable 180.

If the coupling heads 185 become detached, e.g. as a result of an excessive relative movement between the two vehicles F1, F2, this is detected by the second vehicle F2 (e.g. by the control unit 11 thereof). In response, the compressor 183 is actuated, such that the pneumatic muscles 181 are inflated and the cable 180 is wound-in (wherein the pneumatic muscles 181 are again relaxed).

The compressor 183 and the pneumatic muscles 181 and/or the cable reel 182 can function as a drive system, which is configured to move the arm 150' in accordance with the distance between the two vehicles F1, F2 and/or the forces and/or accelerations acting on the arm 150'.

Figure 12:
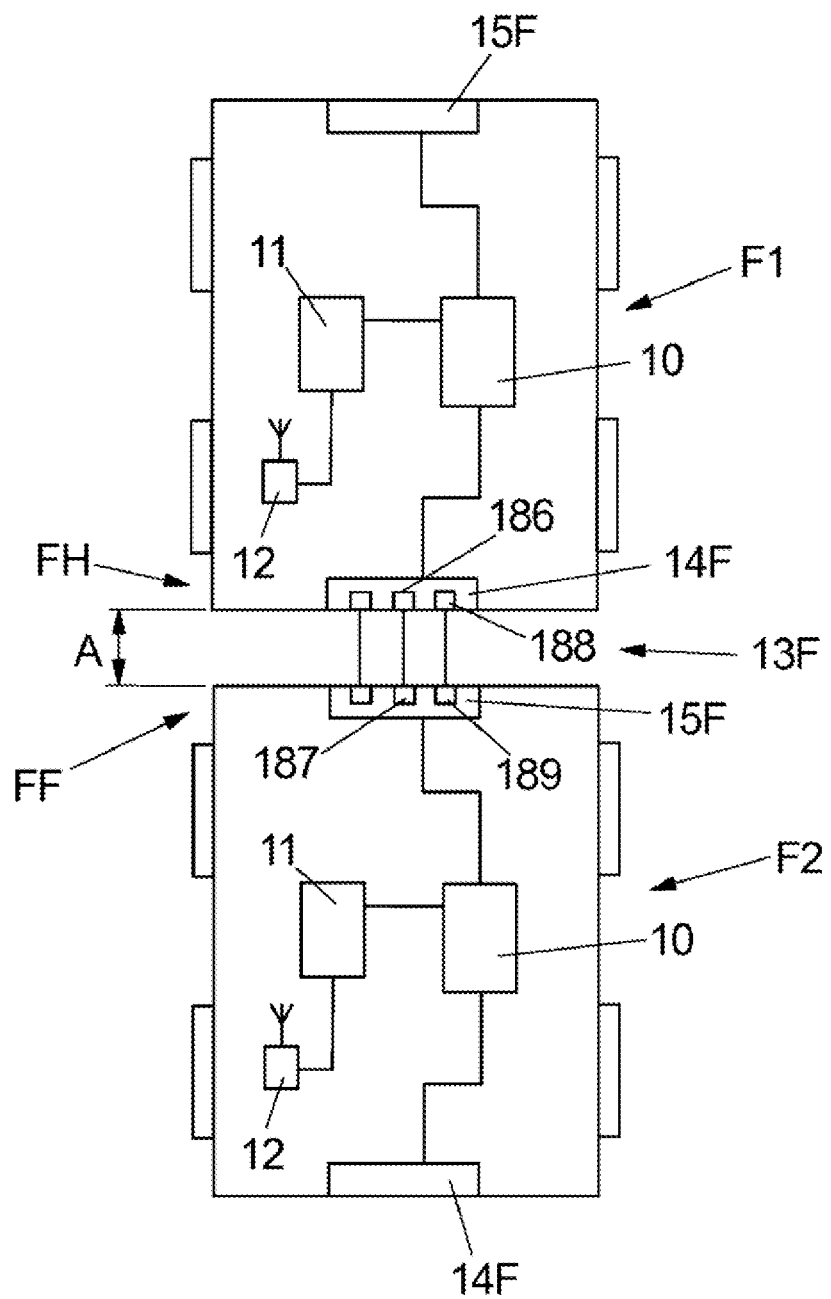
FIG. 12 shows two electrically powered vehicles for application in the system according to FIG. 1 and in the method according to FIG. 8, which are mutually coupled by means of an exemplary embodiment of a coupling device, which is configured for the phototransmission of energy.

FIG. 12 shows two vehicles F1, F2 with a coupling device 13F, which is configured to transmit energy by means of electromagnetic radiation, specifically light (specifically in the infrared or ultraviolet spectrum, although other wavelengths, in the visible spectrum, are also conceivable).

The first vehicle F1 comprises one or more photovoltaic cells 186, and the second vehicle F2 comprises one or more lasers 187 for the transmission of energy. The orientation of the laser beam is controllable in accordance with the position of the two vehicles F1, F2 relative to one another. The laser 187 is aimed at the photovoltaic cell 186. If the mutual distance between the two vehicles F1, F2 exceeds a predefined maximum value, or the photovoltaic cell 186 is lost from the field of vision of the laser 187, the laser 187 is switched off. The laser 187 is a high-power laser.

Figure 13:
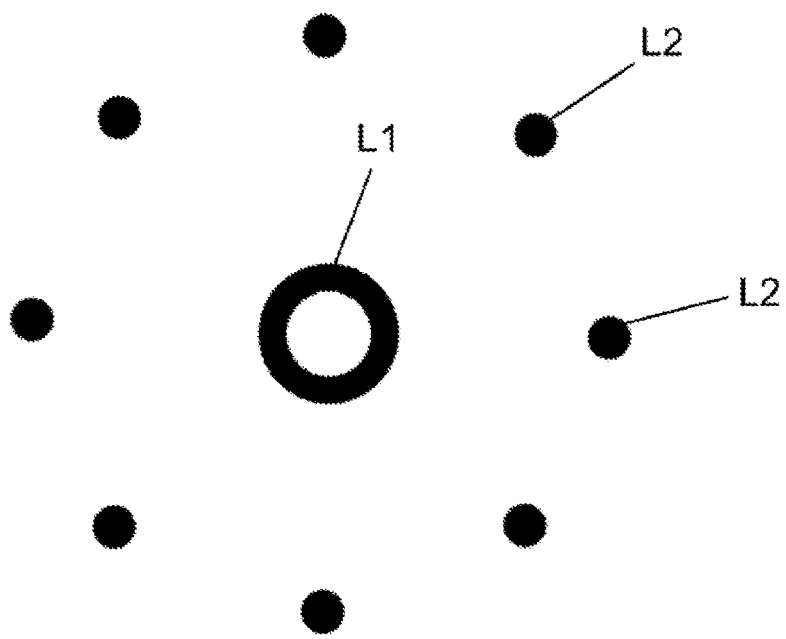
FIG. 13 shows an arrangement of laser beams in the coupling device according to FIG. 12.

Optionally, the second vehicle F2 comprises one or more further lasers 189, which can have a lower power than the high-power laser 187. The lasers 189 emit e.g. a ring of laser beams which are essentially parallel to the laser beam of the high-power laser 187. Reflectors 188 are arranged around the photoelectric cell 186 (e.g. each in the form of a retroreflector). On each of the lasers 189, a photoreceptor, e.g. a photodiode, a camera or similar is provided which detects light (emitted by the respective laser 189) and reflected by one of the reflectors 188. The laser beams L2 of the laser 189 are arranged in accordance with a ring around the high-power laser beam L1 of the high-power laser 187—see FIG. 13. If one or more of the laser beams L2 in the ring is obstructed, e.g. by an animal which moves between the vehicles F1, F2, the photoreceptor of the respective laser 189 registers that the laser beam L2 is no longer being reflected. Thereafter, the respective photoreceptor can transmit a signal to the high-power laser 187, which initiates a switch-off of said high-power laser 187. As the photoreceptors respond substantially more rapidly than the movement of the animal reaches the high-power laser beam L1, it is possible to switch off the high-power laser beam L1 sufficiently rapidly, such that the high-power laser beam L1 does not engage with the animal.

The laser 189 and the reflectors 188 constitute a plurality of light barriers which are arranged around the high-power laser beam L1, wherein other types of light barrier arranged around the high-power laser beam L1 are also conceivable.

Optionally, the light barriers 188, 189 are encoded, e.g. according to wavelength and/or wherein radiation from the light barriers assumes differing pulse characteristics. It can be provided that the high-power laser 187 is switched off if at least one of the encoded light beams does not engage with the respectively associated receiver. It can thus be prevented that the high-power laser 187 is directed to a location other than the photovoltaic cell 186, e.g. in the event of relative movements between the vehicles F1, F2. Moreover, information can be transmitted by means of radiation from the light barriers 188, 189, e.g. concerning a driving state.

LIST OF REFERENCE SYMBOLS

1 System
10 Energy store
11 Control unit
12 Communication unit
13A-13F Coupling device
14A-14F First coupling element
140 Induction coil
141 Coil carrier
142 Coupling socket
143, 144 Electrical contact
145 Electromagnet
146 Counter-bearing
15A-15F Second coupling element
150, 150' Arm
151 Articulated joint
152 Induction coil
153 Coil carrier
154 Articulated joint
155 Coupling ball
156, 157 Electrical contact
158 Electromagnet
159 Hook
16 Sensor
17 Drive system
180 Cable
181 Pneumatic muscle
182 Cable reel
183 Compressor
184 Guide roller
185 Coupling head
186 Photovoltaic cell
187 Laser
188 Reflector
189 Laser
A Distance
Amin Minimum distance
Amax Maximum distance
F1, F2, F3 Vehicle
FF Vehicle front
FH Vehicle tail
L1 High-power laser beam
L2 Laser beam
R1, R2 Route
R1', R2' Changed route
RA Route section
S Carriageway
Z Central unit

What is claimed is:

1. A method for the exchange of electrical energy between at least two moving electrically powered vehicles, comprising the following steps:
   providing an electrically powered first vehicle, which comprises an electrical energy store, wherein the first vehicle can be electrically powered by means of energy stored therein, wherein the energy store can emit electrical energy;
   providing an electrically powered second vehicle, which comprises an electrical energy store, wherein the second vehicle can be electrically powered by means of the energy stored therein, wherein the energy store can receive electrical energy;
   steering the first vehicle along a first route and the second vehicle along a second route, such that both vehicles, at least along a coinciding route section, move at a mutual distance from one another;
   transmitting information concerning a driving state of the first vehicle from the first vehicle to the second vehicle and/or information concerning a driving state of the second vehicle from the second vehicle to the first vehicle;
   adjusting the distance between the vehicles by the steering of the first and/or the second vehicle on the basis of the information transmitted, such that the distance during the movement of both vehicles is greater than a pre-defined minimum distance and smaller than a pre-defined maximum distance; and
   transmitting electrical energy from the energy store of the first vehicle to the energy store of the second vehicle while the distance during the movement of both vehicles is greater than the minimum distance and smaller than the maximum distance,
      wherein at least one of the two vehicles transmits information concerning an intended driving movement and/or change of movement of the corresponding vehicle, and the corresponding vehicle executes said driving movement and/or change of movement with a pre-defined or pre-definable latency delay, in order to compensate for a latency in the response time of the respective other vehicle.

2. The method as claimed in claim 1, wherein the first vehicle moves or is to be moved along a first route and the second vehicle moves or is to be moved along a second route, and the method further comprises the following steps:
  changing the first route and changing the second route such that both changed routes coincide at least along a route section or along an extended route section;
  steering the first vehicle along the changed first route and the second vehicle along the changed second route such that both vehicles move along the coinciding route section at a distance from one another which is smaller than a predefined maximum distance,
  wherein, the step for transmitting electrical energy from the energy store of the first vehicle to the energy store of the second vehicle, electrical energy is transmitted while both vehicles are moving along the coinciding road section.

3. The method as claimed in claim 2, wherein both vehicles are configured as independently driven vehicles.

4. The method as claimed in claim 2, wherein the steering of the vehicles along the changed routes involves a slow-down, an acceleration and/or a stoppage of the first and/or the second vehicle.

5. The method as claimed in claim 2, wherein a third vehicle is located in an interspace between the first and the second vehicle, and the transmission of electrical energy from the energy store of the first vehicle and the energy store of the second vehicle is executed via the third vehicle.

6. The method as claimed in claim 2, wherein a third vehicle is located in an interspace between the first and the second vehicle and the method, prior to the step for the transmission of electrical energy, comprises the following step:
  steering of the third vehicle such that it is removed from the interspace between the first and the second vehicle, specifically by the initiation of an overtaking process by the transmission of at least one command to the first, the second and/or the third vehicle.

7. The method as claimed in claim 1, wherein the information transmitted is an information concerning an actual driving state, a target driving state and/or an anticipated driving state.

8. The method as claimed in claim 1, wherein both information with respect to a driving state of the first vehicle is transmitted to the second vehicle, and information with respect to a driving state of the second vehicle is transmitted to the first vehicle, and the adjustment of the distance between the vehicles is executed by steering the first and second vehicle on the basis of the information transmitted.

9. The method as claimed in claim 1, wherein the transmission of electrical energy from the energy store of the first vehicle to the energy store of the second vehicle is executed by means of a coupling device, which transmits energy in the form of light, specifically in the form of a laser beam.

10. The method as claimed in claim 9, wherein a plurality of light barriers are arranged around the laser beam.

11. A system for the exchange of electrical energy between at least two moving electrically powered vehicles, comprising means for executing the steps of the method as claimed in claim 1.

12. The system as claimed in claim 11, comprising:
  an electrically powered first vehicle, which comprises an electrical energy store, wherein the first vehicle can be electrically powered by means of energy stored therein;
  an electrically powered second vehicle, which comprises an electrical energy store, wherein the second vehicle can be electrically powered by means of energy stored therein; and
  a coupling device for the transmission of electrical energy between the energy store of the first vehicle and the energy store of the second vehicle by means of an electrical coupling of a first coupling element of the coupling device fitted to the first vehicle with a second coupling element of the coupling device fitted to the second vehicle,
    wherein at least one of the two coupling elements comprises an arm which is moveable with respect to the vehicle to which it is fitted, which is configured to bridge a distance between the two vehicles, at least partially, up to a predefined maximum distance.

13. The system as claimed in claim 12, wherein both coupling elements can be at least one of mutually magnetically interlocked and mutually mechanically interlocked.

14. The system as claimed in claim 12, wherein the coupling device comprises a drive system which is configured to move the arm in accordance with a distance between the two vehicles and/or the forces and/or accelerations acting on the arm.

15. The system as claimed in claim 12, wherein the arm comprises at least one pneumatic muscle.

16. The system as claimed in claim 12, wherein the coupling device comprises at least one sensor for measuring the forces and/or accelerations acting on the arm and a drive system for moving the arm, wherein the coupling device is configured to actuate the drive system in accordance with at least one value delivered by the sensor.

17. The system as claimed in claim 11, comprising:
  an electrically powered first vehicle, which comprises an electrical energy store, wherein the first vehicle can be electrically powered by means of energy stored therein;
  an electrically powered second vehicle, which comprises an electrical energy store, wherein the second vehicle can be electrically powered by means of energy stored therein; and
  a coupling device for the transmission of electrical energy between the energy store of the first vehicle and the energy store of the second vehicle by means of an inductive electrical coupling of a first coupling element of the coupling device fitted to the first vehicle with a second coupling element of the coupling device fitted to the second vehicle,
  wherein the first and/or the second coupling element comprise(s) a plurality of induction coils, which are arranged along a concavely or convexly configured section of a vehicle front or a vehicle tail of the first and/or the second vehicle.

18. The system as claimed in claim 17, wherein the first coupling element comprises a plurality of induction coils, which are arranged along a concavely configured section of the vehicle tail of the first vehicle, and the second coupling element comprises a plurality of induction coils which are arranged along a convexly configured section of the vehicle front of the second vehicle.

19. An electrically powered vehicle comprising an electrical energy store, wherein the vehicle can be electrically powered by means of energy stored therein, and a first coupling element and/or a second coupling element of a coupling device for the transmission of electrical energy between the energy store of the vehicle and an energy store of a further vehicle, wherein the vehicle is configured and designed for application in a method as claimed in claim 1.

* * * * *